United States Patent
Liu et al.

(10) Patent No.: US 10,667,143 B2
(45) Date of Patent: May 26, 2020

(54) AIR-TO-GROUND (ATG) UPLINK SUBBAND BEAMFORMER WITH COMBINABLE SUBBANDS

(71) Applicant: QUALCOMM Incorporated, San Diego, CA (US)

(72) Inventors: Chih-Hao Liu, San Diego, CA (US); June Namgoong, San Diego, CA (US); Srikant Jayaraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 15/186,407

(22) Filed: Jun. 17, 2016

(65) Prior Publication Data

US 2017/0019800 A1    Jan. 19, 2017

Related U.S. Application Data

(60) Provisional application No. 62/191,761, filed on Jul. 13, 2015.

(51) Int. Cl.
     *H04W 16/28*    (2009.01)
     *H04B 7/185*    (2006.01)
     *H04W 72/04*    (2009.01)

(52) U.S. Cl.
     CPC ........ *H04W 16/28* (2013.01); *H04B 7/18506* (2013.01); *H04W 72/0413* (2013.01); *H04W 72/0446* (2013.01)

(58) Field of Classification Search
     CPC ............. H04W 16/28; H04W 72/0413; H04W 72/0446; H04B 7/18506
See application file for complete search history.

(56) References Cited

U.S. PATENT DOCUMENTS

| | | | | |
|---|---|---|---|---|
| 2003/0133524 | A1* | 7/2003 | Miller | G01S 19/21 375/347 |
| 2011/0032149 | A1* | 2/2011 | Leabman | H01Q 1/246 342/368 |
| 2013/0272147 | A1* | 10/2013 | Vermani | H04B 7/0891 370/252 |
| 2013/0308714 | A1 | 11/2013 | Xu et al. | |
| 2014/0153534 | A1* | 6/2014 | Kim | H04W 52/146 370/329 |

(Continued)

FOREIGN PATENT DOCUMENTS

| | | | |
|---|---|---|---|
| EP | 2161855 | * | 3/2010 |
| EP | 2161855 A1 | | 3/2010 |

OTHER PUBLICATIONS

International Search Report and Written Opinion—PCT/US2016/038263—ISA/EPO—dated Dec. 21, 2016.

*Primary Examiner* — Redentor Pasia
(74) *Attorney, Agent, or Firm* — Patterson & Sheridan LLP

(57) ABSTRACT

Aspects of the present disclosure generally relate to techniques and apparatus that may help improve greatly reduce the implementation complexity of the ground station, and ground base-station user capacity by utilizing a subband beamformer for processing uplink signals received from aircraft at ground base stations, in an air-to-ground (ATG) system. The techniques presented herein may allow for dynamic subband allocation to different airborne devices with multi-user beamforming and subband combining.

30 Claims, 19 Drawing Sheets

(56) References Cited

U.S. PATENT DOCUMENTS

| | | | |
|---|---|---|---|
| 2014/0266896 A1* | 9/2014 | Hyslop | H04B 7/18506 342/368 |
| 2016/0013838 A1* | 1/2016 | Zhu | H04B 7/043 375/267 |
| 2016/0066321 A1* | 3/2016 | Yu | H04L 5/00 370/329 |
| 2018/0076881 A1* | 3/2018 | Zhu | H04B 7/204 |

\* cited by examiner

*Giga multiplications per seconds
| $N_{el}$ | 36 | 72 | 108 | 144 |
|---|---|---|---|---|
| Subband | 11815 | 12427 | 13039 | 13651 |
| Per-Carrier | 67968 | 135936 | 203904 | 271872 |
| Subband/ Per-Carrier (%) | 17.4% | 9.1% | 6.4% | 5% |
FIG. 11
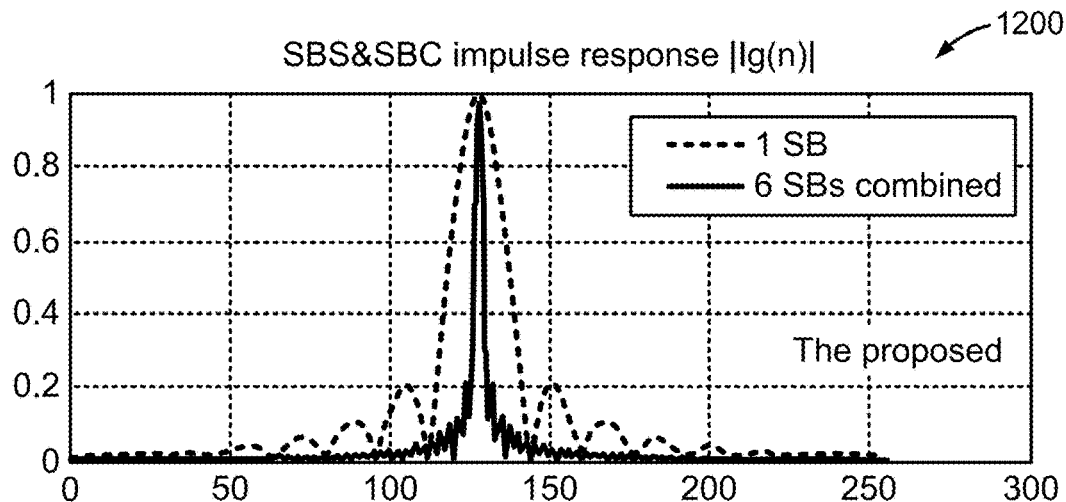
FIG. 12
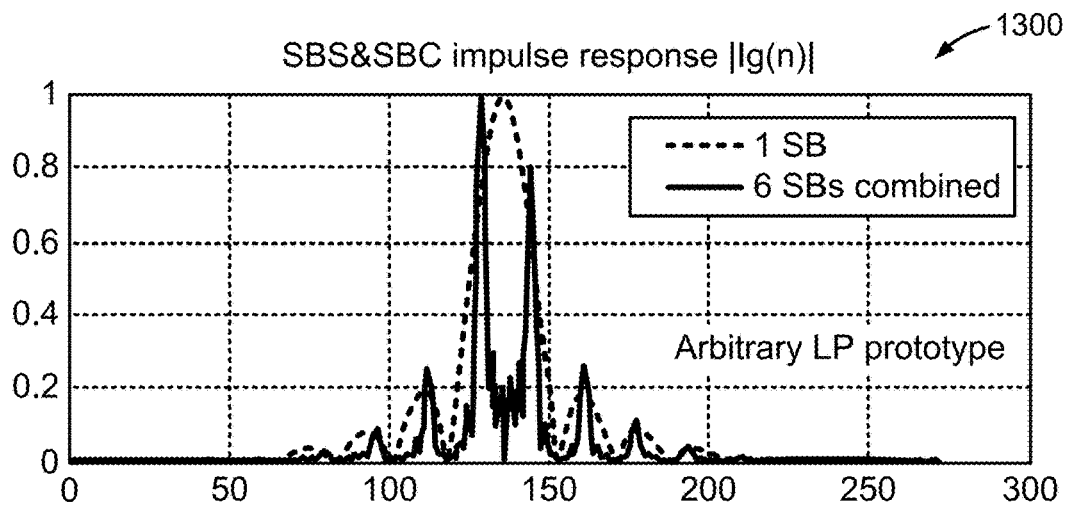
FIG. 13

$$G_i(f) = H_i(f)F_i(f)$$

AIR-TO-GROUND (ATG) UPLINK SUBBAND BEAMFORMER WITH COMBINABLE SUBBANDS

CROSS-REFERENCE TO RELATED APPLICATIONS

This application claims benefit of U.S. Provisional Patent Application Ser. No. 62/191,761, entitled "Air-to-Ground (ATG) Uplink Subband Beamformer with Combinable Subbands," filed Jul. 13, 2015 and assigned to the assignee hereof, the contents of which are hereby incorporated by reference in its entirety.

BACKGROUND

Field of the Disclosure

Aspects of the present disclosure generally relate to beamforming in air-to-ground wireless applications (e.g., where a base station provides service to one or more airborne devices) by performing beamforming on one or more subbeams prior to transmission and using one or more beamformed subbeams to communicate with connected UEs (e.g., aircraft).

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

In Air-to-Ground (ATG) systems used to provide Internet access to airplanes, the airplanes are generally considered wireless terminals (or user equipments) and communicate with terrestrial Ground Base Stations (GBSs) as the airplanes fly over land. A currently used ATG system operating over the continental United States uses 4 MHz of spectrum in the 800 MHz band. While this system may become commercially viable, the limited spectrum may be inadequate to accommodate increasing demand for Internet services, such as streaming of Internet content to aircraft or other bandwidth-intensive operations.

Accordingly, improvements in ATG systems that would accommodate the increasing demand for Internet services are desirable.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications performed, for example, by an apparatus (e.g., a beamformer) that performs uplink beamforming of signals received from aircraft UEs. The method generally includes determining relative angles between a ground station and a plurality of airborne devices, performing beamforming processing, based on the relative angles, on uplink signals received from the airborne devices via a number of antenna elements of the ground station antenna array to generate combined beamformed signals, and feeding the combined beamformed signals to a number of ports of a base station, wherein the number of ports of the base station is less than the number of antenna elements.

Certain aspects of the present disclosure provide an apparatus for beamforming (a beamformer). The beamformer generally includes at least one carrier segregator operably connected to at least one antenna element, wherein said carrier segregator is configured to split a carrier aggregated signal into a plurality of carriers signals, at least one subband segregator configured to partition at least one of said carrier signals into unit subband signals, and a subband combiner operably connected to at least one subband segregator configured to combine said unit subband signals from said antenna elements to produce at least one subband combiner (SBC) output signal.

Certain aspects of the present disclosure provide an apparatus for beamforming. The beamformer generally includes means for determining relative angles between a ground station and a plurality of airborne devices, means for performing beamforming processing, based on the relative angles, on uplink signals received from the airborne devices via a number of antenna elements of the ground station antenna array to generate combined beamformed signals, and means for feeding the combined beamformed signals to a number of ports of a base station, wherein the number of ports of the base station is less than the number of antenna elements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 11 illustrates example savings in complexity of beamforming operations, in accordance with aspects of the present disclosure.

FIGS. 12 and 13 illustrate example impulse responses for beamforming, in accordance with aspects of the present disclosure.

DETAILED DESCRIPTION

Figure 5:
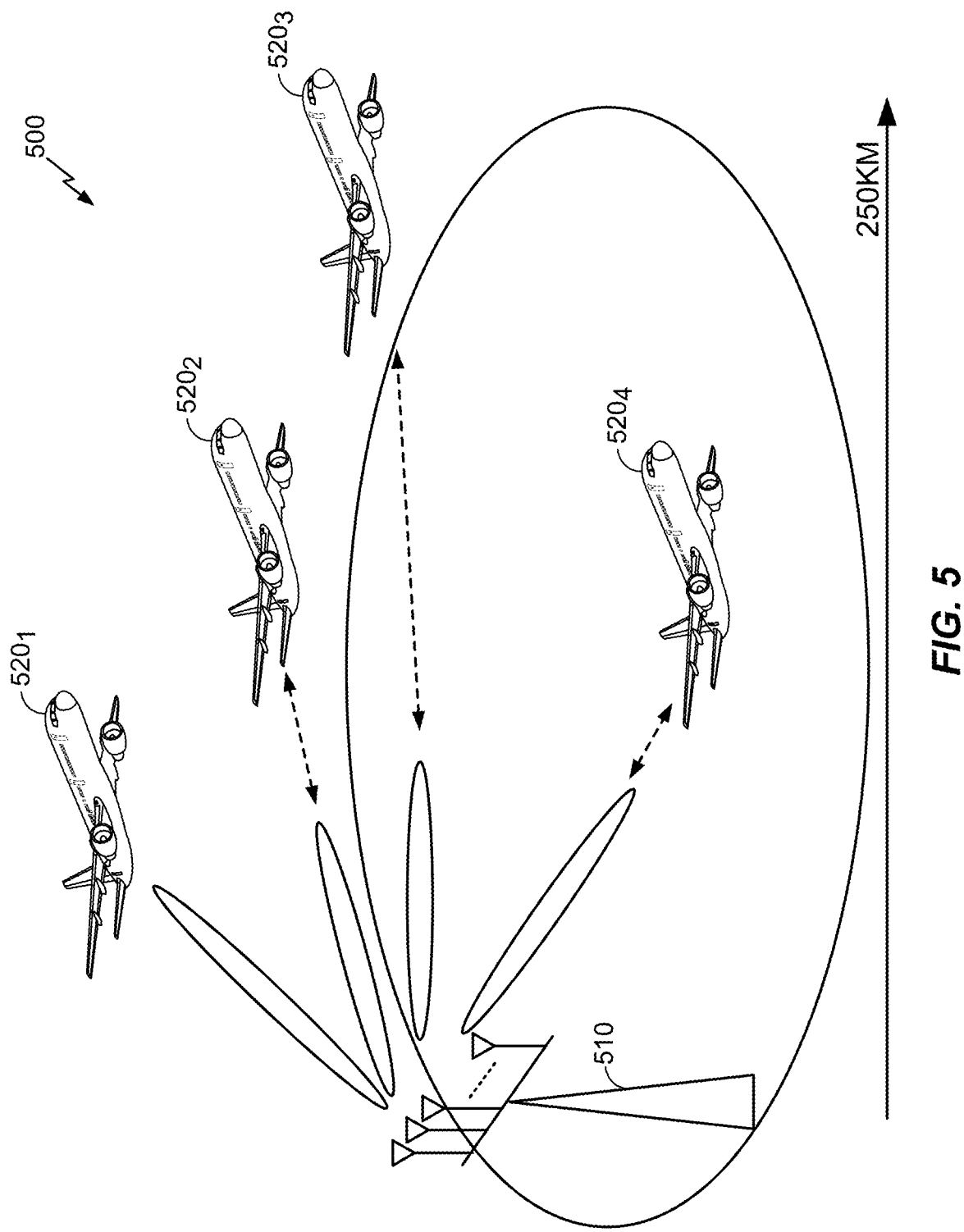
FIG. 5 illustrates an example ground station serving multiple aircraft, in accordance with certain aspects of the present disclosure.

Aspects of the present disclosure provide techniques that may help improve ground base-station user capacity by utilizing a subband beamformer for processing uplink signals received from aircraft, in an air-to-ground (ATG) wireless communications system, such as that shown in FIG. 5. The techniques presented herein may allow for dynamic subband allocation to different UEs (e.g., aircraft) with multi-user beamforming and subband combining.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA technique has similar performance and essentially the same overall complexity as those of an OFDMA system. However, an SC-FDMA signal has a lower peak-to-average power ratio (PAPR) because of its inherent single carrier structure. The SC-FDMA technique has drawn great attention, especially in the uplink communications where lower PAPR greatly benefits the mobile terminal in terms of transmit power efficiency. Use of SC-FDMA is currently a working assumption for uplink multiple access scheme in the 3GPP LTE and the Evolved UTRA.

An access point ("AP") may comprise, be implemented as, or known as a NodeB, a Radio Network Controller ("RNC"), an eNodeB, a Base Station Controller ("BSC"), a Base Transceiver Station ("BTS"), a Base Station ("BS"), a Ground Base Station ("GBS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), an aircraft, an aircraft transceiver located on an aircraft, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

Figure 1:
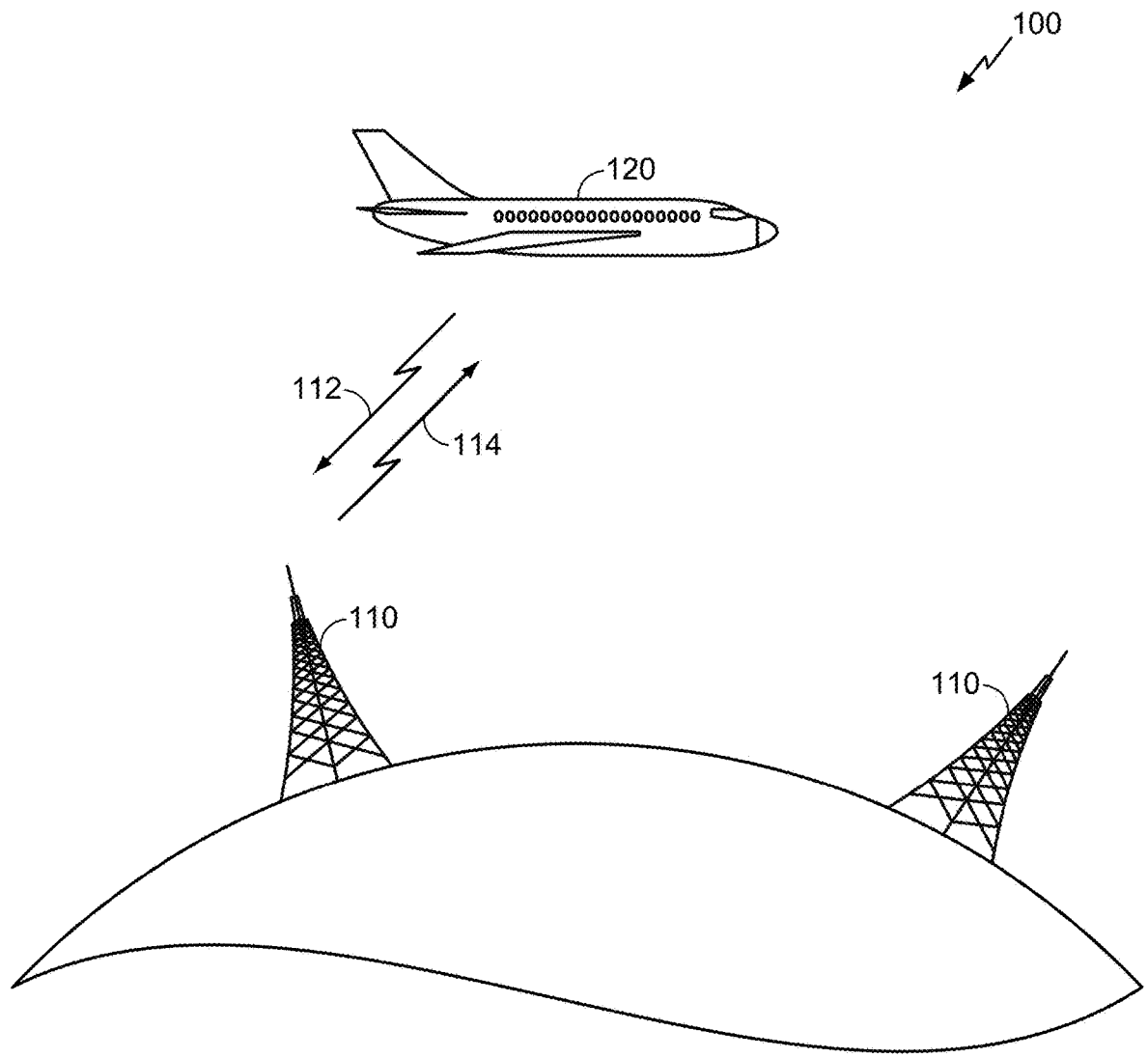
FIG. 1 is a block diagram illustrating an Air-to-Ground (ATG) system, in accordance with certain aspects of the present disclosure.

FIG. 1 illustrates an example air-to-ground (ATG) system 100 in which aspects of the present disclosure may be utilized. In one aspect, the ATG system includes one or more ground base stations 110 that transmit and receive signals on a satellite uplink band (e.g., on a Ku band, with frequencies between 12 GHz and 18 GHz, or a Ka band, with frequencies between 26 GHz and 40 GHz) using a forward link (FL) 112 and a reverse link (RL) 114. An aircraft transceiver (AT) 120, which may be considered a user equipment (UE), in communication with a ground base station (GBS) 110 may also transmit and receive signals on the satellite uplink band using the forward link 112 and reverse link 114. In one aspect, the aircraft transceiver 120 may include a multi-beam switchable array antenna.

In one aspect, the aircraft transceiver 120 may utilize an aircraft antenna that is comprised of a multi-beam switchable array that allows for communication with a GBS 110 at any azimuth/elevation angle. The aircraft antenna may be mounted in any suitable location on the aircraft (e.g., below the fuselage) and have a small protrusion and aerodynamic profile to reduce or minimize wind drag. The antenna elevation coverage, in some cases, may range between approximately 3 degrees to 10 degrees below horizon.

Figure 2:
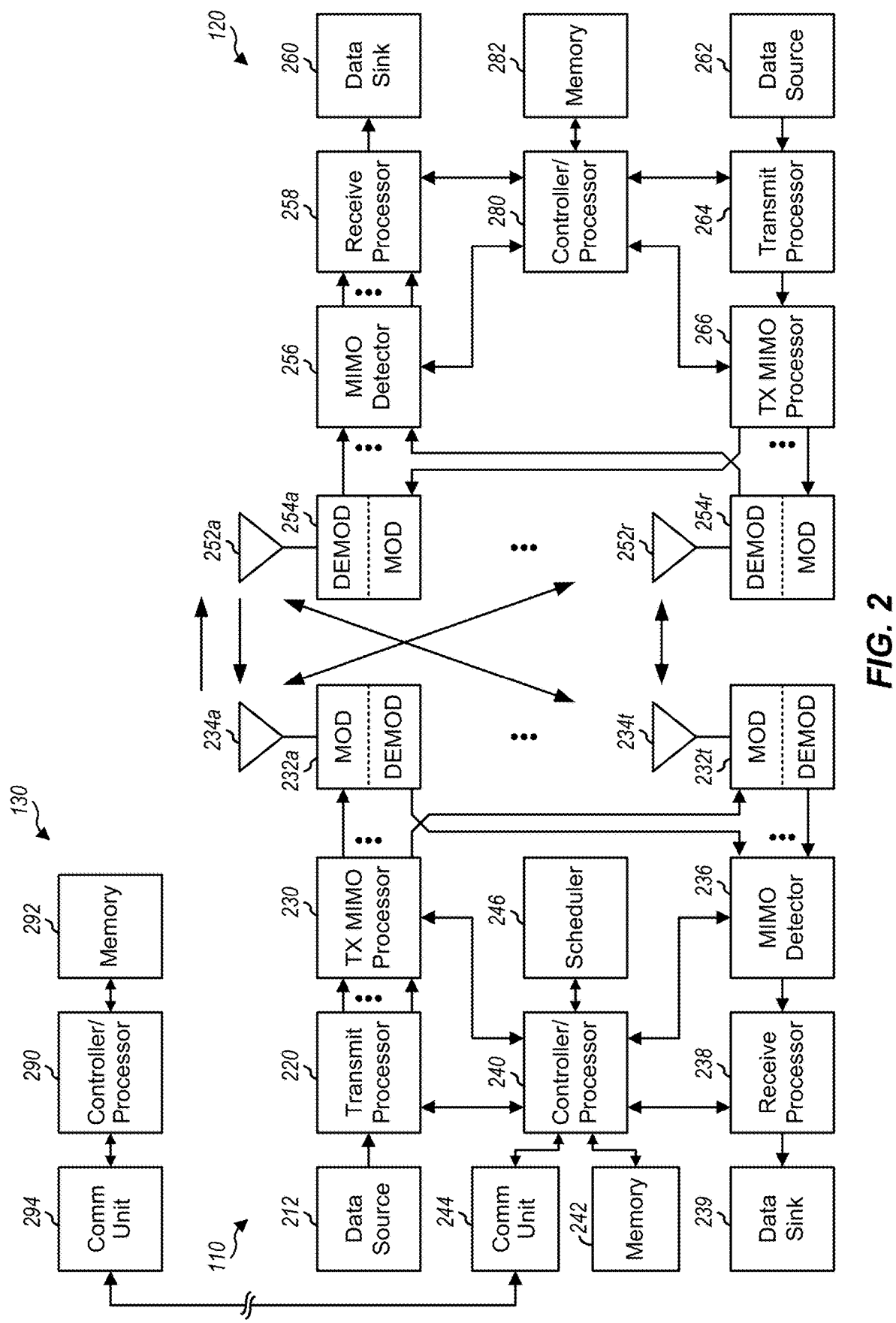
FIG. 2 illustrates a block diagram of a base station and a user equipment, in accordance with certain aspects of the present disclosure.

FIG. 2 illustrates example components of the GBS/eNB 110 and AT/UE 120 illustrated in FIG. 1, in which LTE-based communications may be used to implement an ATG system.

FIG. 2 illustrates a block diagram of one example of a base station (e.g. GBS/eNB 110) and a user equipment 120 (e.g., an aircraft transceiver) in a multiple-input multiple-output (MIMO) system. Transmitter system 210 and receiver system 250 may be examples of the present disclosure, according to certain aspects.

At GBS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from GBS 110 and/or other GBSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A temperature sensor 284 (e.g., a thermocouple) may sense a temperature (e.g., an ambient temperature or a temperature of the UE) and supply information regarding the temperature to the controller/processor, receive processor, and/or transmit processor. The controller/processor may store information regarding the operation of a crystal oscillator (e.g., a crystal oscillator in a demodulator) at the temperature in memory 282. While receiving a signal, the controller/processor and/or receive processor may use information regarding the operation of the crystal oscillator and the temperature in determining a precision of the crystal oscillator. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at GBS 110 and UE 120, respectively. Memories 242 and 282 may store data and program codes for GBS 110 and UE 120, respectively. A scheduler 246 may schedule UEs for data transmission on the downlink and/or uplink.

Figure 3:
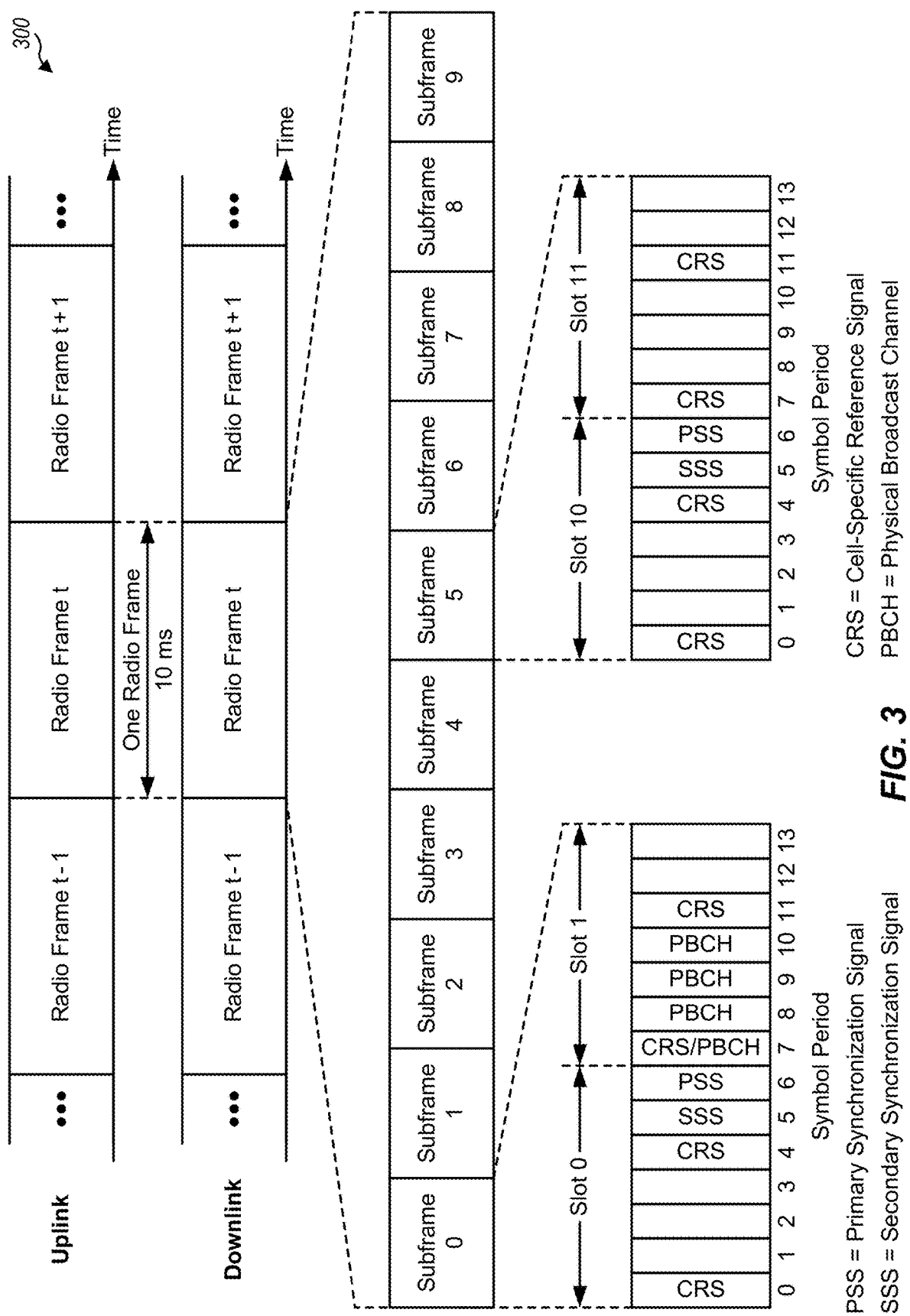
FIG. 3 is a block diagram conceptually illustrating an example of frame structure in a telecommunications system.

FIG. 3 shows an exemplary frame structure 300 for FDD in LTE. The transmission timeline for each of the downlink and uplink may be partitioned into units of radio frames. Each radio frame may have a predetermined duration (e.g., 10 ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2 L symbol periods in each subframe may be assigned indices of 0 through 2 L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. For example, the PSS may provide the UE with information regarding the physical layer identity (e.g., 0 to 2) of an LTE cell. An LTE cell belongs to one of three groups of physical layer cell identities, and the physical layer identity may indicate which group. The PSS may also be used by the UE in symbol timing detection, frequency offset detection, etc. The SSS may provide the UE with information regarding the physical layer cell identity group number (e.g., 0 to 167) and may be used by the UE for radio frame timing detection, cyclic prefix length detection, time division duplexing (TDD)/frequency division duplexing (FDD) detection, etc.

With the physical layer identity (e.g., from PSS) and the physical layer cell identity group number (e.g., from SSS), the UE may determine the physical layer cell identity (PCI) for a given cell. Once the UE knows the PCI for a given cell, as described below, the UE may know the location of reference signals transmitted from the cell and may be able to receive and decode system information (e.g., used for acquiring the cell) transmitted from the cell.

The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames.

The PBCH may carry some system information (e.g., the master information block (MIB)) that, in general, may be used by UEs for initial access to the cell, and the like. For example, the PBCH may carry information regarding system bandwidth, number of transmit antennas, system frame number, etc. The eNB may also transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
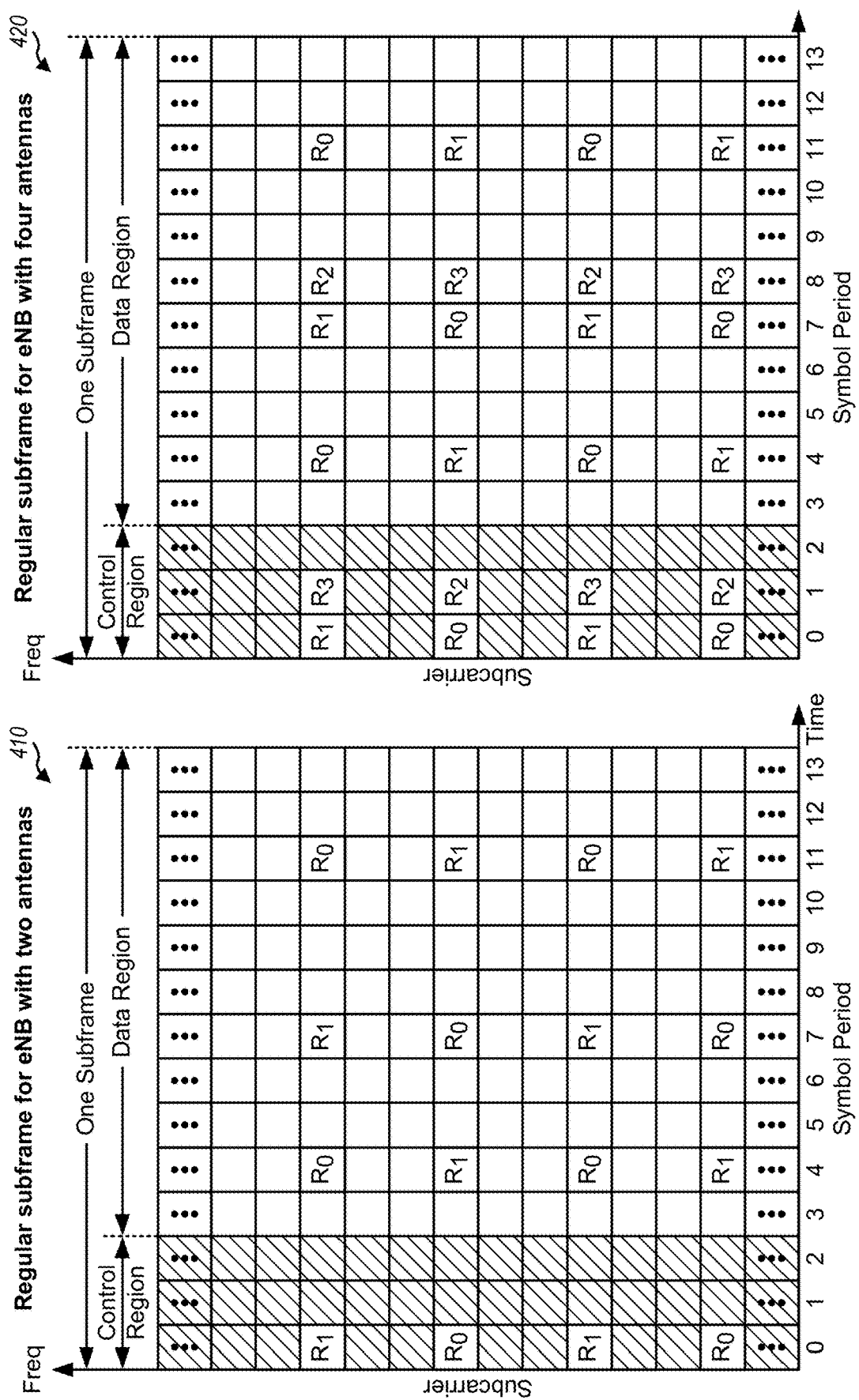
FIG. 4 illustrates an example subframe resource element mapping, according to aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example Air-to-Ground (Atg) Uplink Subband Beamformer with Combinable Unit Subbands As described above, LTE communications may be used in certain ATG systems. For example, LTE communications may be used for the uplink receiver of such a system (to process uplink signals received from aircraft). Such a system may operate, for example, in the 14.0-14.5 GHz Ku band and co-exist with primary satellite communications. Aspects of the present disclosure may allow such an LTE-based ATG uplink system to deliver a multi-gigabit per second (Gbps) data rate with relatively minor modifications of commercial LTE modules (e.g., multiple port eNodeBs with 19.6 MHz bandwidth carriers and 19.6 MHz UE cards).

FIG. 5 illustrates an example of an ATG system 500 including a GBS/eNB 510 and a plurality of UEs (aircraft) 520. In some cases, ATG system 500 may be designed to support multi-gigabit per second (Gbps) data rates using a 250 MHz bandwidth. In ATG system 500, UEs (aircraft) may be subject to radiated power restrictions, as high radiated power may generate interference that may impact the primary use of satellite communications.

Figure 6:
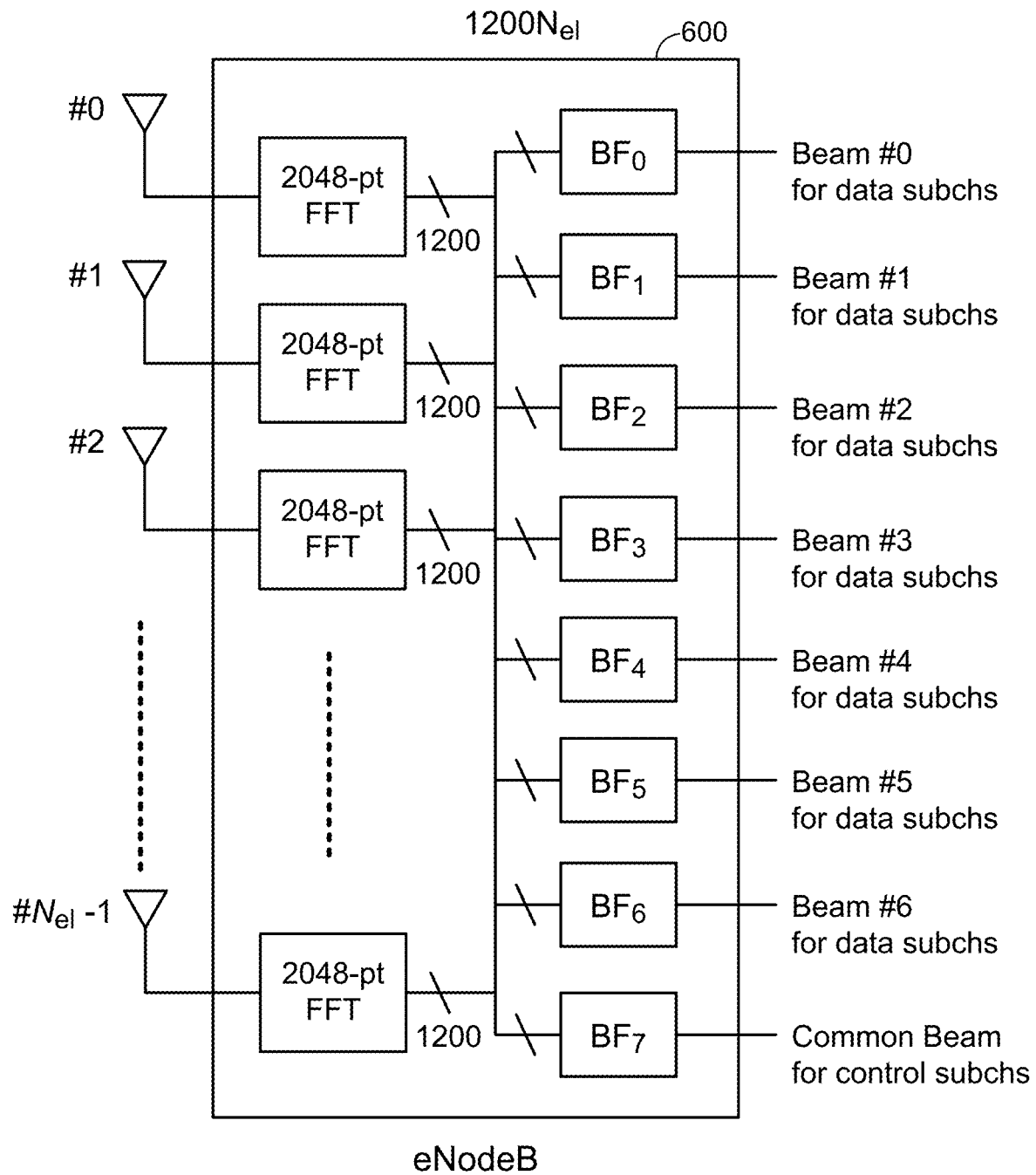
FIGS. 6 and 7 illustrates an example beamforming design and corresponding signals for multiple UEs.

As illustrated in FIG. 6, a uniform linear antenna array (ULA) at a ground base station (eNodeB) 600 with multiple beams pointing to different UEs in azimuth/elevation angles may be able to exploit spatial diversity to improve the link budget and increase the user data rate. In one example, a beamforming antenna with 72 antenna elements may be used.

A ground base station may need to serve hundreds of aircraft. To do so, an electrically-programmable ULA with several antenna elements may be used to provide a sufficient link budget. In some cases, multi-gigabit throughput may be achieved via spatial division multiple access (SDMA) by forming multiple beams for the same frequency resource, as well as frequency division multiple access (FDMA) by assigning different resource blocks (RBs) to separated UEs.

Figure 7:
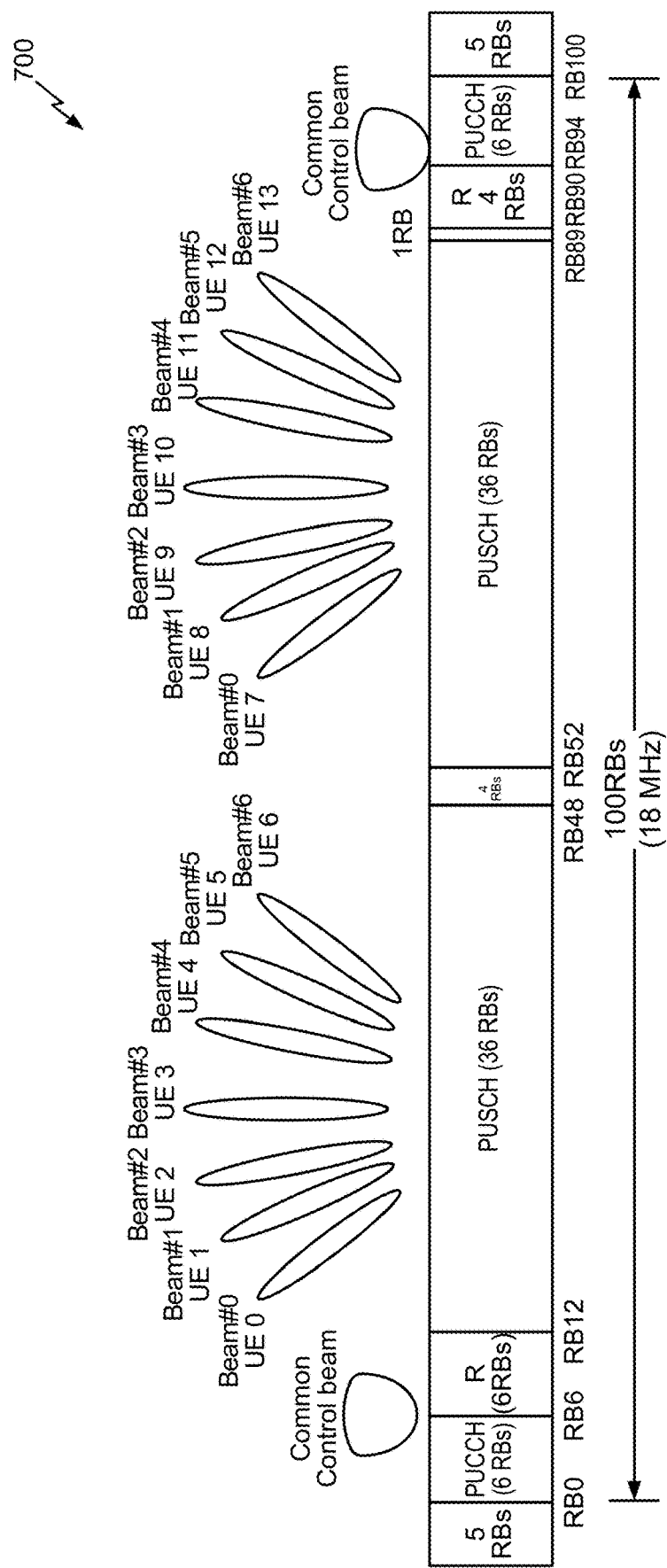

In some cases, multi-gigabit per second throughput in an ATG wireless communication system may be implemented using an FFT with a size proportional to the bandwidth of the carrier at each antenna element and perform multiuser beamforming for each tone, as illustrated in FIG. 6. As illustrated in FIG. 7, an FFT with a size proportional to a carrier bandwidth at each antenna element may accommodate both SDMA and FDMA for a plurality of UE (aircraft). A system bandwidth 700 may be partitioned into a plurality of subbeams for serving one or more UEs. However, this approach may be prohibitively expensive (in terms of cost, equipment complexity, and/or computational expense) if the ground base station (eNodeB) has a large number of antenna elements, with correspondingly complex routing of individual tones from FFTs to corresponding beamformers (BFs).

Aspects of the present disclosure may help efficiently serve many UEs (aircraft) with increased data rates by utilizing a subband beamformer structure. A subband beamformer structure may utilize subband filters to provide sufficient subband separation such that subband beamforming may be performed on a corresponding subband signal. Without such subband separation, inter-beam interference (IBI) between UEs in the same subband may arise, for example, if an adjacent subband (or subbands) is used to serve a UE having a similar azimuth/elevation angle.

To improve the base station user capacity, aspects of the present disclosure may partition each (19.6 MHz) carrier of the LTE uplink into several subbands and dynamically allocate one or more unit subbands to different UEs, allowing several active UEs to be efficiently served. As will be described in greater detail below, multi-user beamforming may be performed on each subband (e.g., for multiple aircraft UEs at different azimuth/elevation angles). As used herein, the term "unit subband" generally refers to the resource of the smallest bandwidth allocated to any UE. The unit subbands within a carrier may be defined such that a guard band is generally present between adjacent unit subbands. A beamformer can be simply designed for a particular unit subband size. However, such a beamformer design will provide suboptimal performance if subband size allocated to a UE is larger than the chosen unit subband size. Alternatively, several beamformers can be implemented that operate simultaneously, each optimized for different combination of subband sizes for each UE. However, in this case, the optimal performance is achieved, but with a prohibitively complex and computationally expensive implementation.

Techniques presented herein also provide for dynamic allocation of unit subbands to UEs without performance degradation or large increases in implementation and/or computational complexity. As discussed in further detail herein, each UE may be dynamically allocated a subband larger than more than one unit subband, for example, when there are a few active UEs with heavy data traffic. Thus, when the proposed techniques are employed, the throughput of each UE is not capped by the bandwidth of a single unit subband, which is chosen for the worst case with the large number of active UE's. As conventional LTE uplink is limited to transmission on consecutive tones, a subband allocated to a UE may consist of consecutive unit subbands, with the guard bands in between those unit subbands used by the UE to transmit its own subband signal. The outputs from the subband filters corresponding to the unit subbands that comprise the subband are combined to obtain the subband signal of a UE. The subband filters may be designed such that, after the subband filter outputs are combined, the subband signal of the UE undergoes minimal distortion. Hence, the beamforming techniques presented herein may leverage good subband separation and subband combinability.

Figure 8:
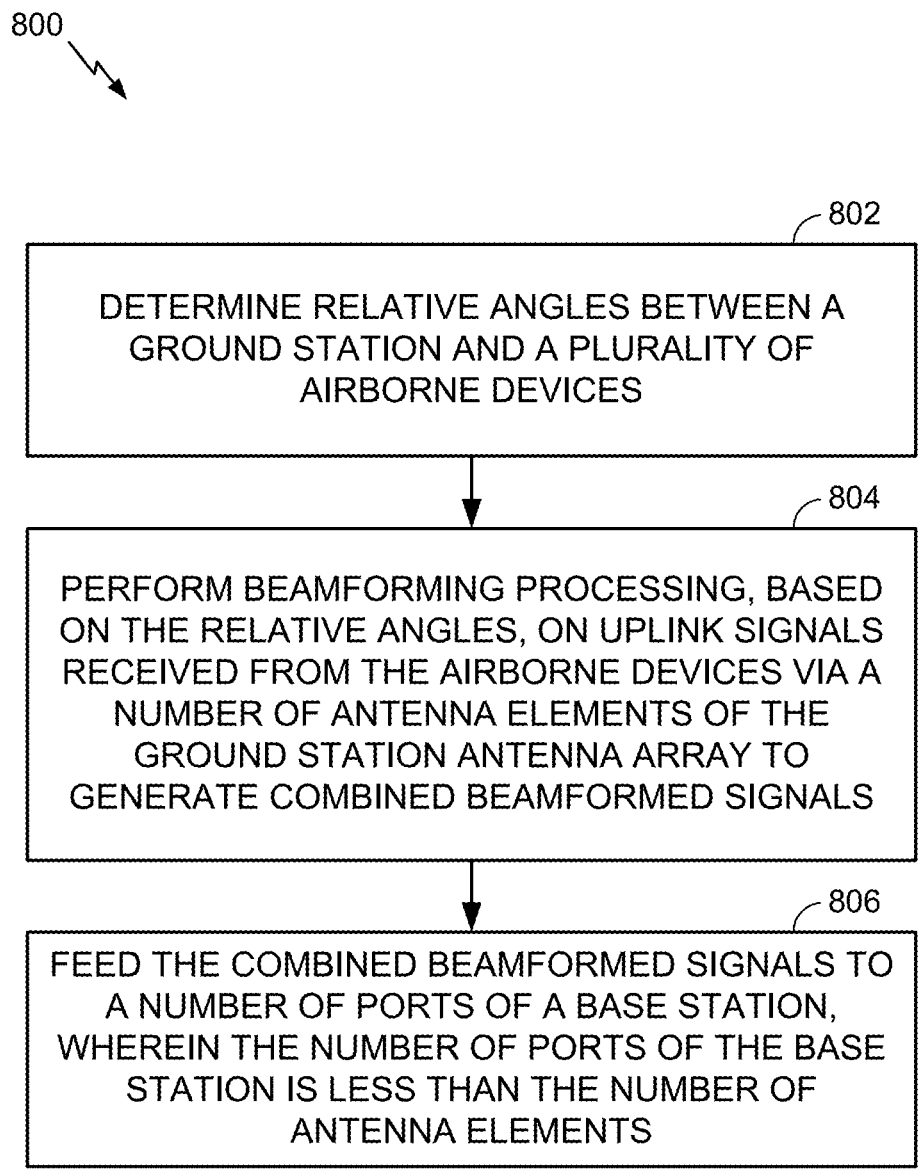
FIG. 8 illustrates example operations for performing uplink beamforming, in accordance with aspects of the present disclosure.

FIG. 8 illustrates example operations 800 that may be performed, for example, by an uplink beamformer, in accordance with aspects of the present disclosure. Such a beamformer may be part of a ground base station that utilizes LTE eNBs for processing uplink signals from UE aircraft. The operations 800 begin, at 802, by determining relative angles between a ground station and a plurality of airborne devices (e.g., with aircraft transceivers). At 804, the beamformer performs beamforming processing, based on the relative angles, on uplink signals received from the airborne devices via a number of antenna elements of the ground station antenna array to generate combined beamformed signals. At 806, the beamformer feeds the combined beamformed signals to a number of ports of a base station, wherein the number of ports of the base station is less than the number of antenna elements.

Figure 9:
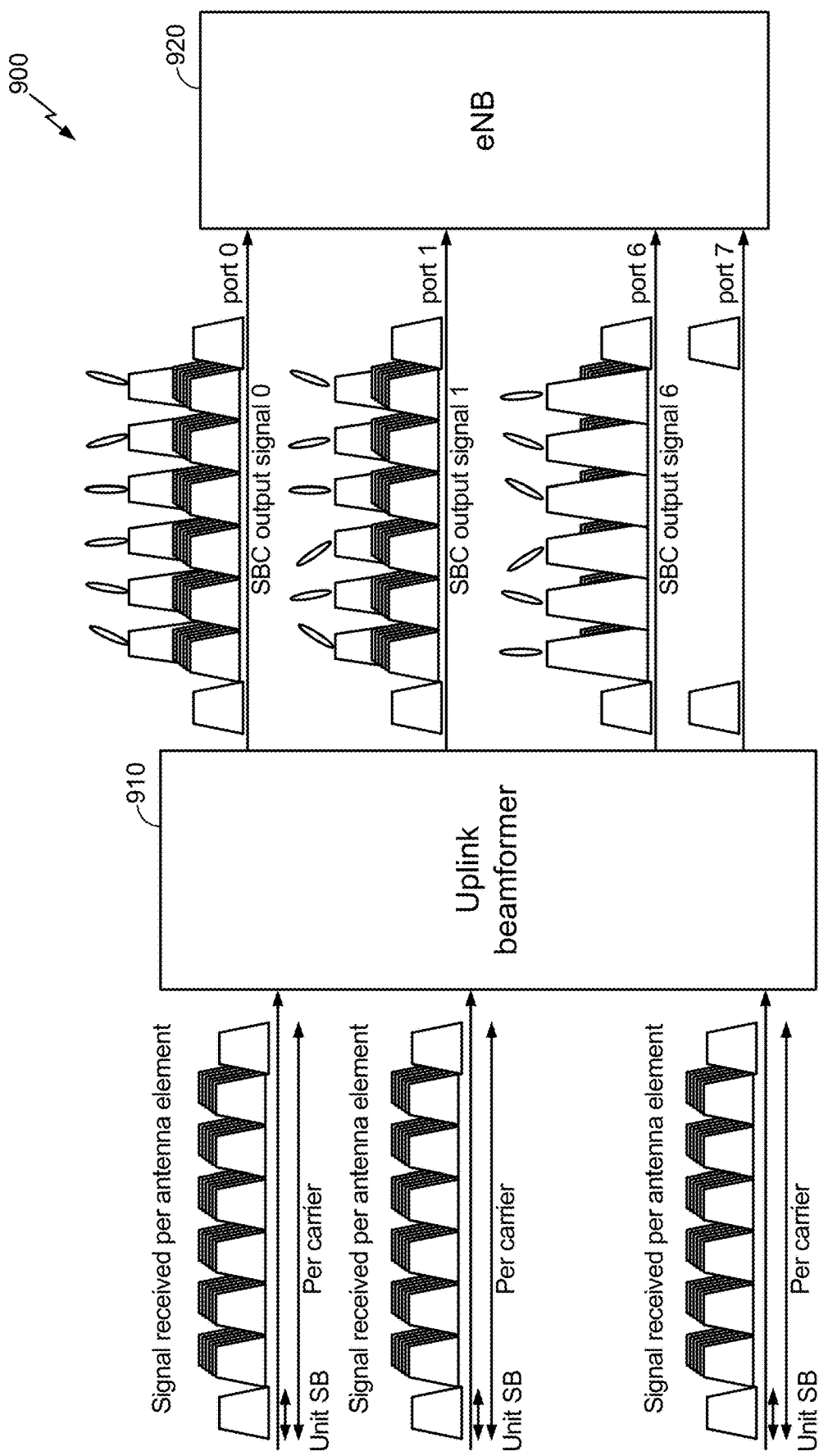
FIG. 9 illustrates an example beamforming design, in accordance with aspects of the present disclosure.

FIG. 9 illustrates an example subband beamformer 900, in accordance with aspects of the present disclosure. As illustrated, subband beamformer 900 generally includes an UL beamformer 910 configured to feed one or more signals into a ground base station/eNodeB 920. The beamforming design described herein may be implemented, for example, using an efficient DFT filterbank subband beamformer which can support dynamic subband allocation with multi-user beamforming and subband combining. When the number of antenna elements is large, the beamforming design described herein may be more efficient than using an FFT with a size proportional to the carrier bandwidth at each antenna element and performing per-tone beamforming afterwards.

The subband beamformer 900 described herein may also allow multiple consecutive unit subbands to be assigned to a UE for UE signal transmission. The UEs may transmit an actual signal in the guard bands positioned between the unit subbands. The subband beamformer may, for example, implement an iterative filter design algorithm in which the combination of consecutive subband filters has a flat passband frequency response and in which each subband filter has good separation from the other subband filters by exploiting the guardband.

In some cases, the subband beamformer 900 described herein may allow a large array of ($N_{el}$) antenna elements to be used to improve a link budget while using relatively low-complexity base station elements (eNodeBs) with a far fewer number of ports ($N_p$) than antenna elements (e.g., $N_p \ll N_{el}$). Thus, each ground base station/eNodeB 920 may only need $N_p \times 2048$ FFTs (e.g., with $N_p=8$). The techniques described herein used by the uplink beamformer may efficiently combine high dimension subband signals from the $N_{el}$ antenna elements to obtain a smaller number of signals to be fed into the $N_p$ ports of the eNB than with conventional designs.

This approach may maximize network capacity with space and frequency dynamic allocation by dynamically assigning bandwidth to each beam to match spatial and frequency varying demands where SDMA spatially multiplexes same frequency resources to different aircraft UEs and FDMA allocates different contiguous chunks of RBs to different aircraft UEs. As will be described in greater detail below, an airplane tracking system (or "genie") may provide real time azimuth/elevation angles of the aircraft UEs. As illustrated in FIG. 9, a ground base station/eNodeB 920 may utilize a dedicated port (port 7 in the illustrated example) for processing omni-control signals (sent omni-directionally), such as PRACH and PUCCH signals. The omni-directional PRACH and PUCCH signals are denoted by the unit subbands (SB) going into port 7 of the eNB in FIG. 9. As illustrated, other ports (e.g., ports 0-6) may process beamformed signals, such as PUSCH, as well as some omni-signals (e.g., an omni PUCCH). A scheduler may perform space and frequency dynamic allocation, for example, based on the traffic load and azimuth/elevation angles of the UEs provided by the genie tracking system.

In general, a TD-LTE system with carrier aggregation (CA) of $N_c$ contiguous carriers may be used to support the $N_c \cdot B_w$ MHz bandwidth (for example, a bandwidth of 250 MHz with a carrier spacing of $B_w$). As an illustrative example, $B_w$ may be assumed to be 19.8 MHz, while $N_c$ is 12. At each antenna element, the carrier segregator splits the $N_c \cdot B_w$ MHz input signal into $N_c$ 19.8 MHz carrier signals i.e., 250 MHz/12=19.8 MHz. A subband segregator associated with each antenna element partitions the 19.8 MHz carrier signals into $N_{sb}$ unit subbands (or frequency bands). For example, each 19.8 MHz carrier signal may be partitioned into $N_{sb} \times 13.75$ resource block (RB) unit subbands (e.g., with $N_{sb}=8$) by the subband segregator, and the unit subband signals may be downsampled by a factor of $N_{sb}$ (e.g., with the unit subband size of 13.75 RBs and the number of subbands $N_{sb}$ representing one example). By dividing the 19.8 MHz signal by $N_{sb}$, it can be processed at a lower sampling rate.

The unit subband partition allows for allocation of different frequency resources, via FDMA, to different aircrafts. Further, the same unit subband may be multiplexed among (spatially separated) aircrafts, via separate beams. Downsampling the subband signal to lower sampling rates lowers the complexity of subband beamforming at a later stage. The beamforming is applied to each of the subbands. Subband filters in the subband combiner may provide sufficiently good subband separation to avoid inter-beam interference (IBI).

In the illustrated example, 8 subband signals per carrier from each of the $N_{el}$ antenna elements are coherently combined by a subband beamformer as eight beamformed unit subband signals. Combining subband signals from each of the $N_{el}$ antenna elements may result in generation of a 19.8 MHz LTE signal, with each subband having a beamforming gain increased by the subband combiner. As discussed above, a dedicated aircraft tracking system, or "genie," may provide azimuth/elevation angles of each aircraft to the scheduler. The scheduler, in turn, may provide the angles of each unit data subband to the beamformers, and the beamformers may compute and apply weights accordingly.

Figure 10:
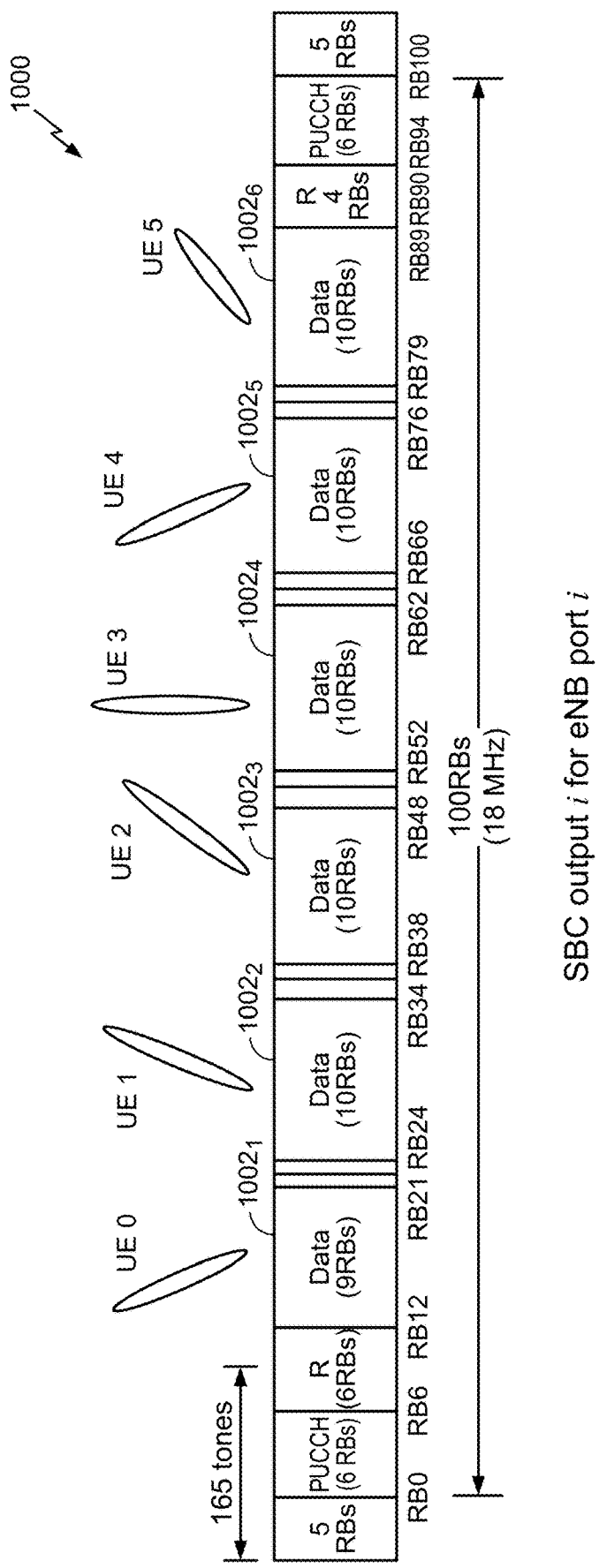
FIG. 10 illustrates example subband combiner output signals, in accordance with aspects of the present disclosure.

FIG. 10 illustrates an example of subband combiner output signals 1000 (e.g., corresponding to an $i^{th}$ subband combiner of FIG. 9), in accordance with aspects of the present disclosure. As illustrated, the $i^{th}$ subband combiner (SBC) may form beams for data unit subbands (SBs) and combine the beamformed unit subband signals into an SBC output signal i which is input to one of the ports of the eNB. The data unit subbands are shown as the middle 6 unit subbands 1002 in FIG. 10. This approach may result in a high directional array gain for each unit subband. By using beamformed unit subbands and combining the beamformed unit subband signals into a subband combiner output signal, the base station can provide 10 $\log_{10} N_{el}$ antenna gain with electronically steerable beams without a completely re-engineered LTE eNodeB. At the same time, the eNodeB scheduler does not lose its ability to maximize the network capacity in different scenarios. As shown in FIG. 10, within the eight SBC outputs, 7 are directional data beams and 1 is an omni control beam. SDMA allows the same data unit subband to be multiplexed to 7 widely separated aircrafts with 7 data beams. FDMA allows scheduler to assign different unit data subbands to different aircrafts. Each carrier provides UL data links for up to 42 widely separated aircraft per carrier. $N_p$ SBC outputs are transmitted to an $N_o$-ports of the eNodeB and decoded independently by a $N_p \times 2048$-pts FFT.

The subband filters of subband segregator (SBS) and subband combiner (SBC) are generally designed with good spectral separation and subband combinability. Good subband separation of the subband filters and the guard bands between unit data subbands prevents IBI. Subband combinability supports dynamic subband sizing to maximize network throughput. Subband combinability generally allows a scheduler to combine contiguous unit subbands and the guard bands in between the unit subbands with a small passband ripple to minimize data rate losses (e.g., less than 0.3 dB passband ripple). For example, if the subband size needed to serve a UE is larger than the unit subband size, the scheduler generally combines unit subbands to form a "fat" subband by assigning the same angle $\theta_{k,i}$ to contiguous data unit subbands. In one example, a beamformer can form a 2-unit subband. In another example, a beamformer can form a 3-unit subband. With dynamic subband sizing, one beamformer can be used to form a subband comprising any number of unit subbands (e.g, a subband including up to six unit subbands). Different aircraft may use different subband sizes (e.g., based on an amount of traffic generated by devices on the aircraft).

FIG. 11 illustrates example savings 1100 in complexity of beamforming operations, in accordance with aspects of the present disclosure. In some cases, the complexity advantage of the techniques described herein relative to a "per carrier" design is substantial. For example, as illustrated, for a 144 antenna element system, the design described may have 5% of the complexity of the per-carrier design.

FIGS. 12 and 13 illustrate example impulse responses for beamforming, in accordance with aspects of the present disclosure, with constant subband segregation (SBS) and subband combining (SBC). In FIGS. 12 and 13, a solid green plot shows the impulse response where 6 subbands are combined. FIG. 12 illustrates the impulse response 1200 of the subbeam beamforming techniques described herein, and FIG. 13 illustrates the impulse response 1300 of a prior art solution. As illustrated, the temporal spread of the impulse response 1200 of the unit subband beamforming techniques described herein may be shorter than the impulse response 1300. In some cases, an eNB may expect to see the same propagation delay regardless of the bandwidth occupied by a UE. As illustrated, the unit subband beamforming techniques described herein may result in a constant delay when unit subbands are combined, while combining unit subbands may lead to a shorter impulse response. Without the beamforming techniques described, in some cases, the temporal spread may not reduce significantly when unit subbands are combined (e.g., as illustrated by impulse response 1300 in FIG. 13). The temporal spread illustrated by impulse response 1300 may result in poor quality channel estimation at the eNB which may, in turn, degrade UL throughput.

Figure 14:
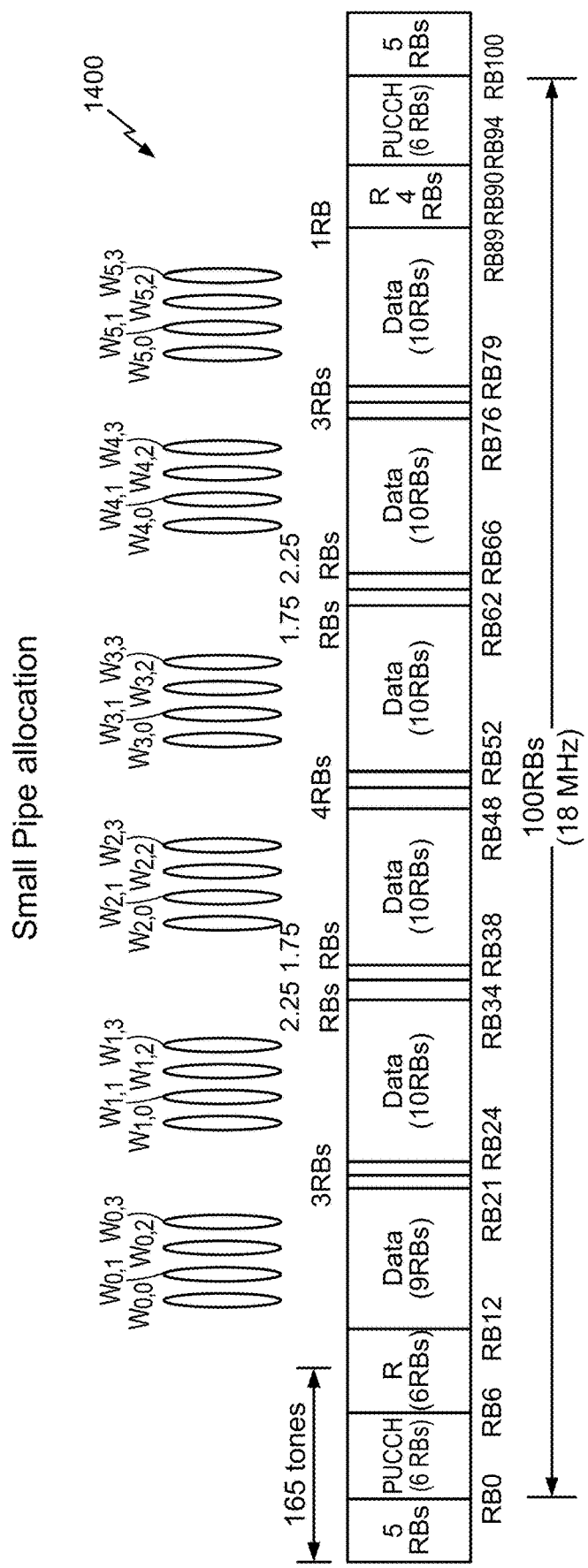
FIG. 14 illustrates an example allocation of resources to many UEs with a light traffic load, in accordance with aspects of the present disclosure.

Dynamic allocation for subband beamformers based on the number of active UEs may be illustrated with reference to the "small pipe allocations" illustrated in FIG. 14 for a large number of UEs (e.g., aircraft with light traffic volume) and with reference to the "fat pipe allocations" illustrated FIG. 15 for a small number of UEs (e.g., aircraft with heavy traffic volume). As illustrated by the "small pipe allocation" 1400 in FIG. 14, the 19.6 MHz carrier may be uniformly divided into 8 subbands. The middle 6 subbands may be assigned as data subbands, with each data subband having a size of 9 or 10 resource blocks (RBs). The "small pipe allocation" 1400 may serve a large number of UEs (aircraft), but may entail transmissions at a relatively low data rate. For example, each data subband k may serve four UEs at different azimuth/elevation angles with beamforming weight vectors $w_{k,0}$, $w_{k,1}$, $w_{k,2}$, and $w_{k,3}$ in the ULA (e.g., the beamformer). Guard bands may be present between the beamformed data subbands. The guard bands may, in some cases, facilitate the design of subband filters in the subband aggregator and the subband combiner to prevent inter-beam interference (IBI). The control subbands (PUCCH, PRACH and MSG3 denoted by "R") may form an omni-beam so similar gains are seen across similar azimuth/elevation angles. As illustrated in FIG. 14, the subband allocation for "small pipe allocation" 1400 may serve 24 UEs with a data bandwidth of 9 or 10 RBs.

Figure 15:
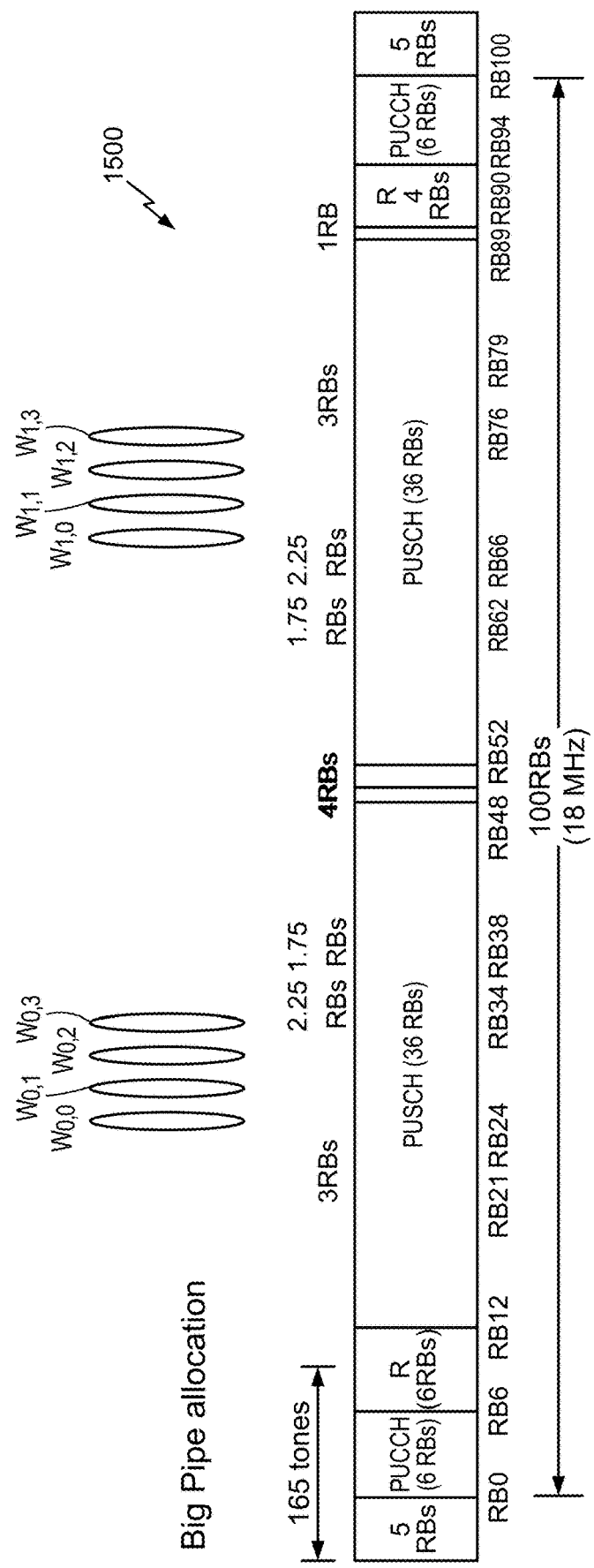
FIG. 15 illustrates an example allocation of resources to a few UEs with a heavy traffic load, in accordance with aspects of the present disclosure.

FIG. 15 illustrates an example "large pipe allocation" 1500 that may serve 8 UEs (aircraft) having heavy traffic loads. With a large number of UEs (aircraft) with light traffic load, good subband separation allows the scheduler to independently allocate each unit data subband to different sets of UEs (aircraft) without the IBI as shown in "small pipe allocation" 1400. When there are a small number of UEs (aircraft) with heavy traffic load, the combinable subband property of the subband separator and subband combiner described herein allows the scheduler to combine arbitrary numbers of contiguous unit data subbands and the guard bands between the constituent unit subbands into a single larger data pipe. By combining a number of contiguous unit subbands that span an assigned bandwidth into a single larger data pipe, the UL bandwidth of a UE (aircraft) may not be capped by the unit subband size (e.g., capped by the bandwidth provided by the 9 or 10 RB subbands described above with respect to "small pipe allocation" 1400). In this example, six data subbands of FIG. 14, totaling 72 RBs, are combined consecutively into two data subbands with a bandwidth of 36 RBs. Each subband, illustrated in "large pipe allocation" 1500 with 3 unit subbands combined, may be assigned to a UE (aircraft) with heavy traffic. Each 36 RB data subband may serve seven UEs at different azimuth/elevation angles with different beamforming vectors in the ULA. "Large pipe allocation" 1500, using, for example, the two 36 RB subbands illustrated in FIG. 15, may allow each UE (aircraft) to support a higher data rate than the allocation shown in FIG. 14.

Figure 16:
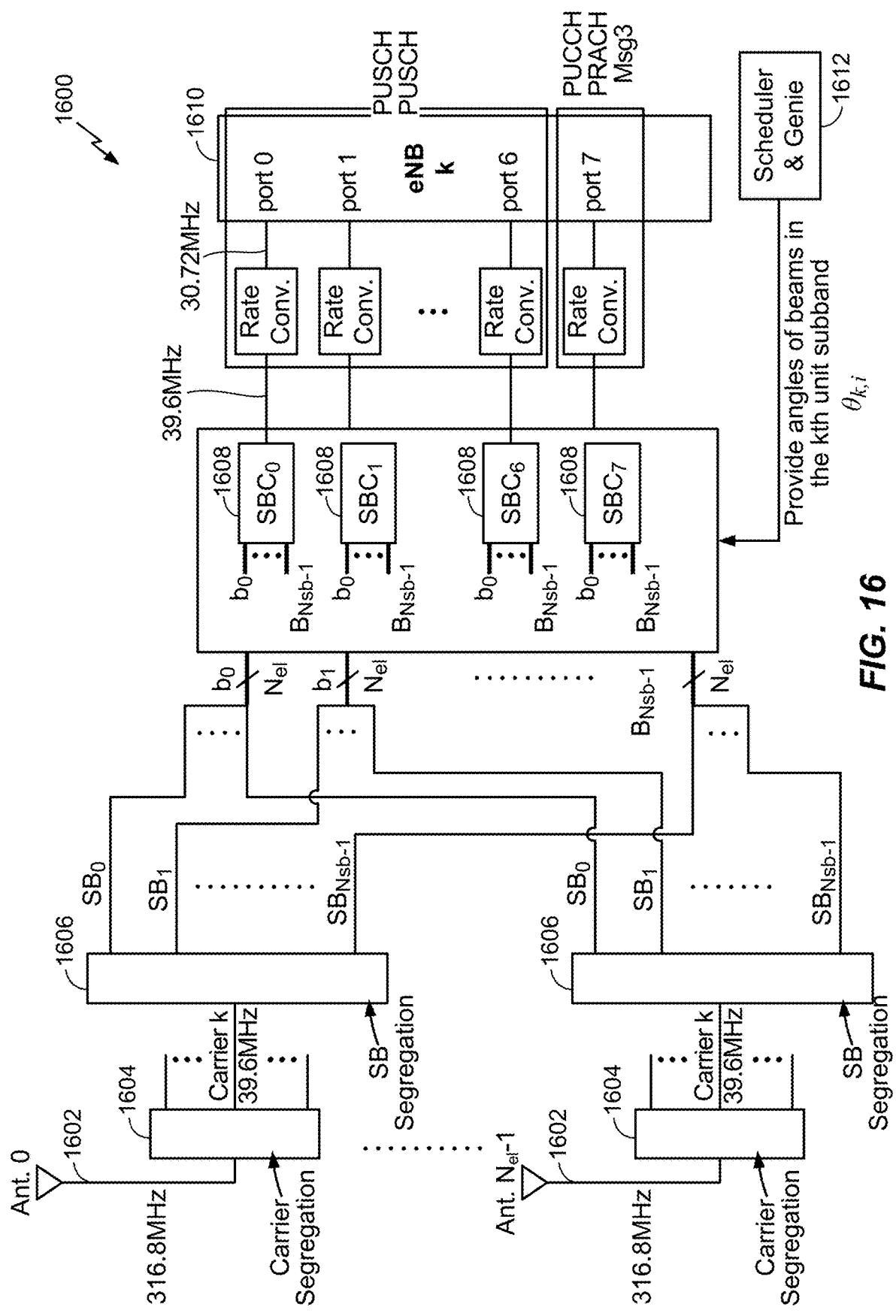
FIG. 16 illustrates an example structure for uplink beamforming, in accordance with aspects of the present disclosure.
Figure 17:
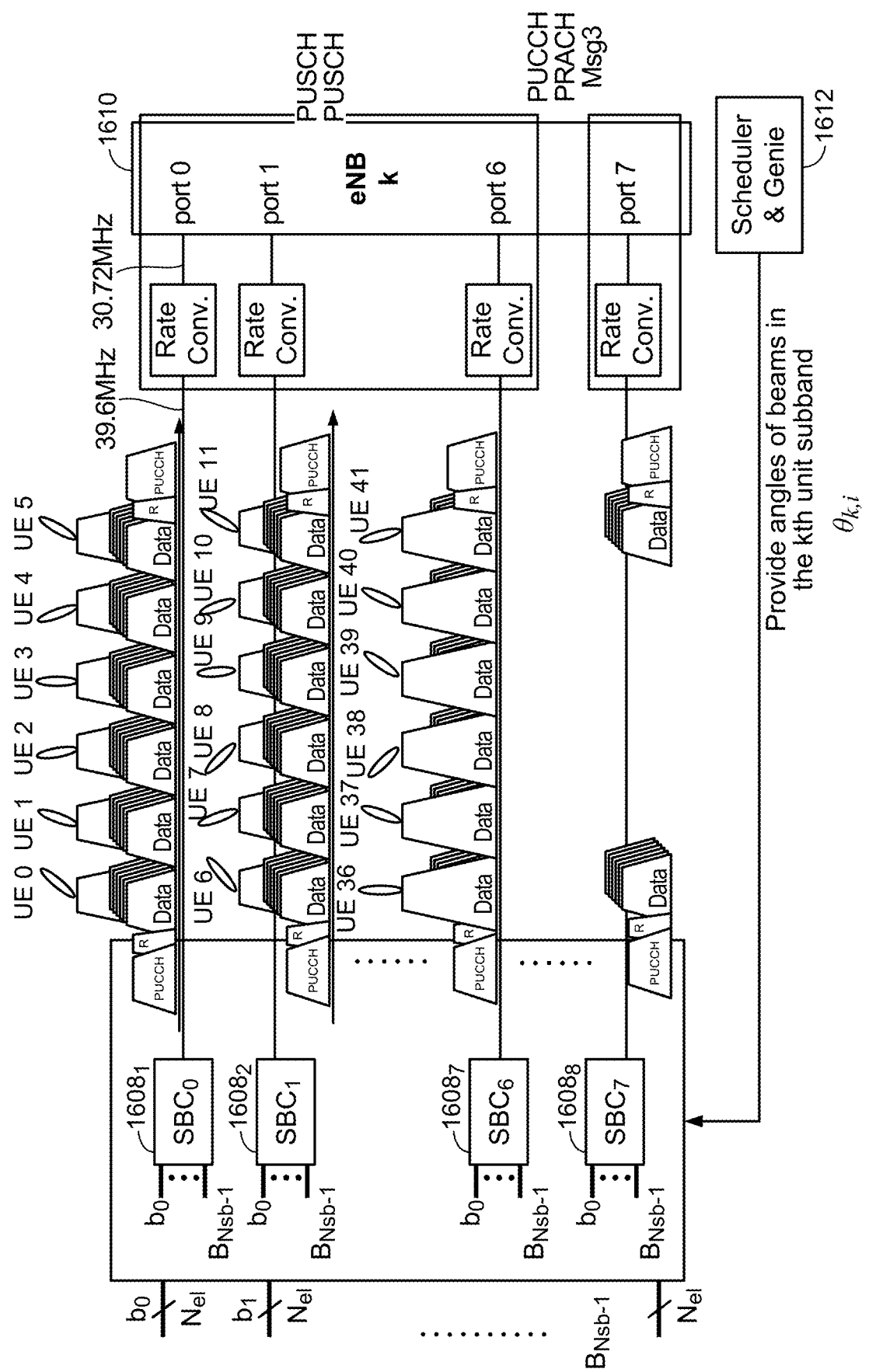
FIG. 17 illustrates example subband combiner output signals for the example structure shown in FIG. 16.

FIG. 16 illustrates an uplink subband beamformer 1600, in accordance with aspects of the present disclosure. FIG. 17 illustrates example subband combiner output signals 1700 for the example uplink subband beamformer 1600 illustrated in FIG. 16.

As noted above, the uplink subband beamformer 1600 illustrated in FIG. 16 may help achieve multi-Gbps uplink bandwidth and accommodate dynamic subband allocation based on the number of UEs served by the eNodeB 1610. As illustrated, the uplink subband beamformer 1600 is equipped with $N_{el}$ antenna elements 1602 and an RF front-end (including LNA, ADC, etc.). The input signal of each antenna element 1602 may be sampled at 316.8 MHz. Uplink subband beamformer 1600 also includes $N_{el}$ carrier segregators 1604. Each antenna element 1602 may be coupled to a carrier segregator 1604. The carrier segregator 1604 extracts the signal for each 19.8 MHz carrier received on the front end and downsamples the signal at 39.6 MHz. For a 250 MHz system bandwidth, carrier segregator may extract signals for up to twelve 19.8 MHz carriers.

Figure 18:
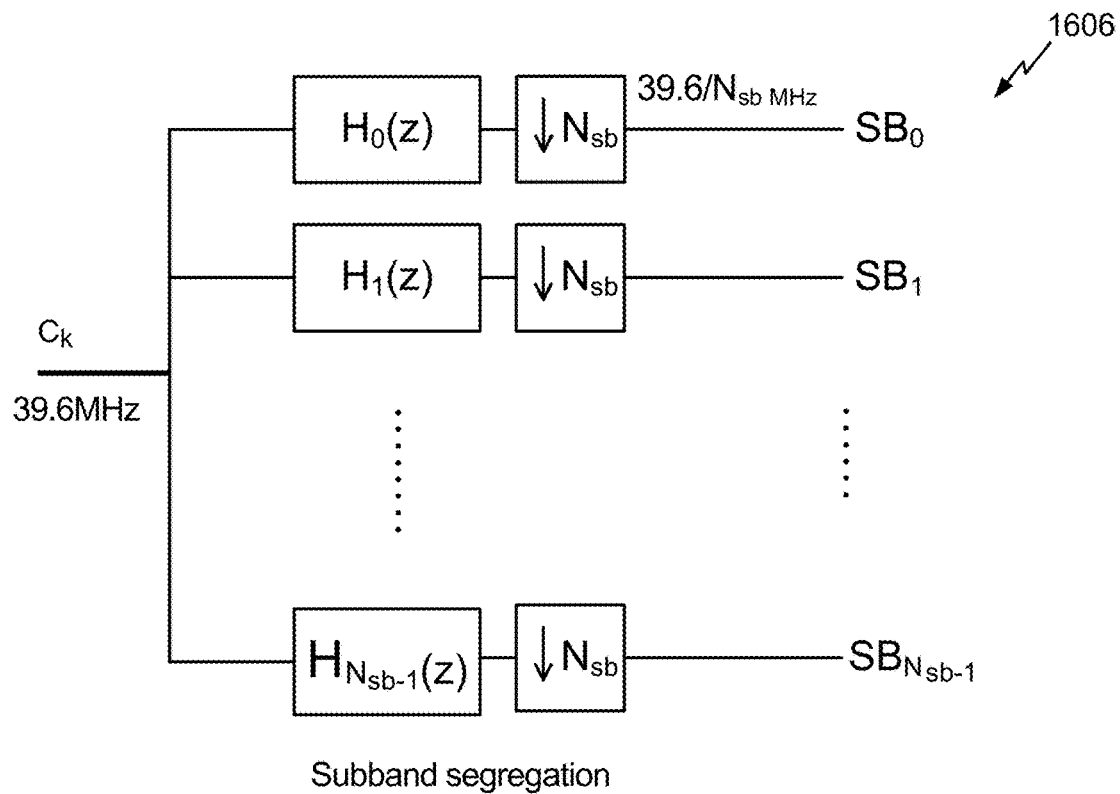
FIG. 18 illustrates example subband segregation, in accordance with aspects of the present disclosure.
Figure 19:
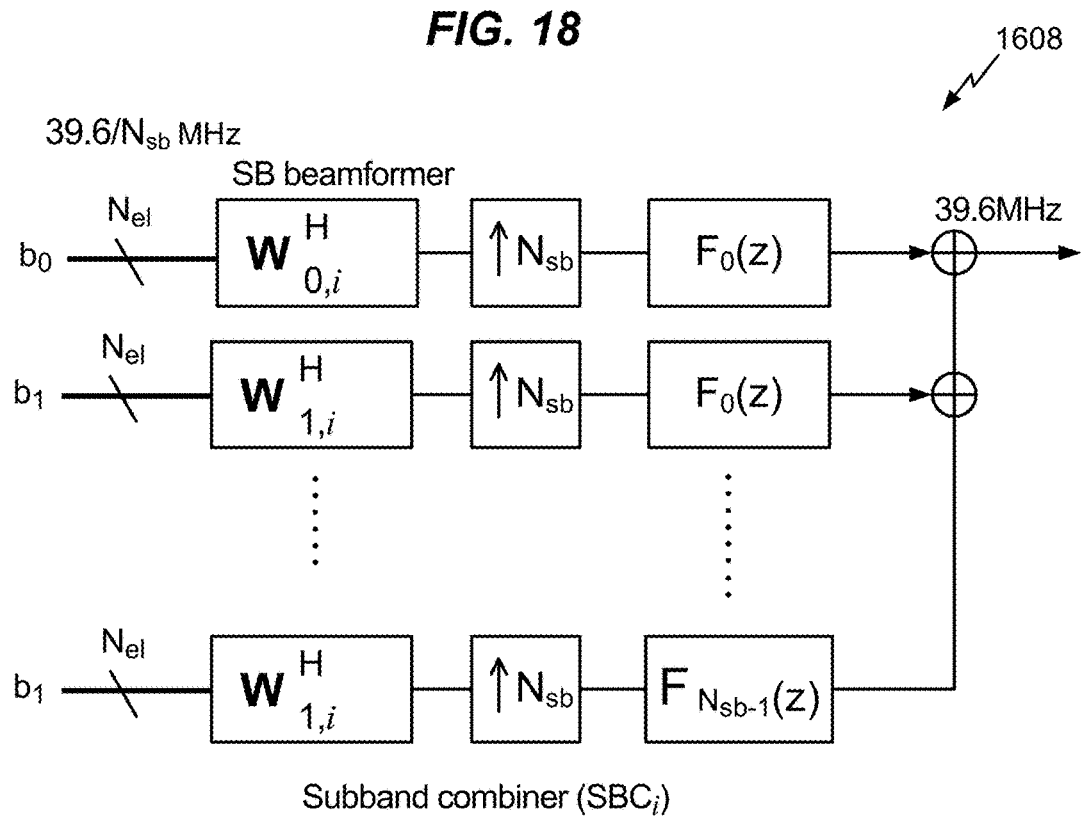
FIG. 19 illustrates example subband combining, in accordance with aspects of the present disclosure.

To accommodate dynamic subband allocation to different UEs, as described above with reference to FIGS. 14 and 15, the subband segregator 1606 shown in FIG. 18 and the subband combiner 1608 shown in FIG. 19 may be utilized to uniformly partition each 19.6 MHz carrier into $N_{sb}$ unit subbands. Partitioning each carrier into $N_{sb}$ unit subbands may enable the use of FDMA for serving multiple UEs (aircraft). There are $N_{el}$ subband segregators 1606 per carrier and up to 8 subband combiners 1608 per carrier. A subband segregator 1606 may be present for each antenna element per carrier. Both the subband segregator and the subband combiner are DFT filters, such that the SB filters $H_k(z)$ and $F_k(z)$ are frequency translated versions of the real lowpass prototype filters H(z) and F(z).

$$H_k(z) = H(zW_{2N_{sb}}^k), \; F_k(z) = F(zW_{2N_{sb}}^k), \; W_{2N_{sb}} = e^{\frac{-j\pi}{N_{sb}}}$$

As illustrated, uplink subband beamformer 1600 additionally includes an 8-port eNodeB 1610 per carrier and a scheduler/genie tracking system 1612.

As illustrated in FIG. 17, to accommodate SDMA, 7 sets of subband beamformers are included in $SBC_0$ $1608_1$-$SBC_6$ $1608_7$ such that each data unit subband can spatially multiplex up to 7 widely separated UEs (aircraft). The data unit subbands may be combined by 7 subband combiners into seven 19.8 MHz data substreams and transmitted to 7 designated data ports of an eNodeB 1610 for transmission to a plurality of UEs (aircraft). Each subband combiner 1608 generally beamforms to a UE (aircraft) in each subband and synthesizes unit subbands to a 19.8 MHz subband combiner output signal, which is provided to a port at eNodeB 1610. The subband combiner 1608 for eNodeB 1610 port i ($SBC_i$) in FIG. 19 takes the signals $b_0$~$b_{Nsb-1}$ from $N_{sb}$ unit subbands from each of the $N_{el}$ antenna elements, where $b_k$ is a $N_{el} \times 1$ signal vector of the $k^{th}$ subband from $N_{el}$ antenna elements. Subband combiner 1608 performs beamforming for the $i^{th}$ UE in each unit subband by multiplying row beamforming vectors, $w_{k,i}^H$, with the corresponding subband signal vector $b_k$. The beamformed subband signals are then filtered by the corresponding subband filters, $F_k(z)$, before being combined. Conceptually, the $k^{th}$ subband in FIG. 19 forms a beam to the $i^{th}$ user with beamforming vector $w_{k,i}$, where $w_{k,i} \in C^{Nel \times 1}$ and $w_{k,i}$ is a column vector which, for example, may be a beamforming vector.

To calculate beamforming vector $w_{k,i}$ for data subbands (PUSCH), the beamforming weight is a function of the UE angle:

$$[w_{k,i}]_n = e^{\frac{j2\pi n d \sin(\theta_{k,i})}{\lambda}}$$

where d is the spacing between antenna elements in ULA, $\lambda$ is the wavelength, and $\theta_{k,i}$ is the function of azimuth and elevation angle of the $i^{th}$ user in subband k. The genie tracking system generally provides angles of each UE (aircraft) to the scheduler, and the scheduler generally determines $\theta_{k,i}$ and provides $\theta_{k,i}$ to the beamformer.

For control subbands, there may be a single trivial beam with $N_{el}$-1 zeros and 1 one in $w_{k,i}$, which may allow for formation of an OMNI beam (or a non-beamformed beam) with a weight of 1000. To combine the $k^{th}$ to the $(k+l)^{th}$ contiguous unit subbands, the scheduler 1612 may assign $\theta_{k,i}= \ldots =\theta_{k+l,i}$ for all i, where i represents each UE. For the OMNI beam, angles $\theta_{k,i}$ may be identical. The subband combiner 1608 forms a beam to a UE for each thin/fat subband, and synthesizes a frequency multiplexed 20 MHz LTE signal that an eNodeB 1610 can decode. In FIG. 16, $SBC_0$-$SBC_6$ generally forms beams to seven individual users for each data subband and passes the beamformed signal to port 0-port 6 of eNodeB 1610, respectively. $SBC_7$ may form a special beam for the control subbands (e.g., the OMNI beam) and passes the combined signal to port 7.

Figure 20:
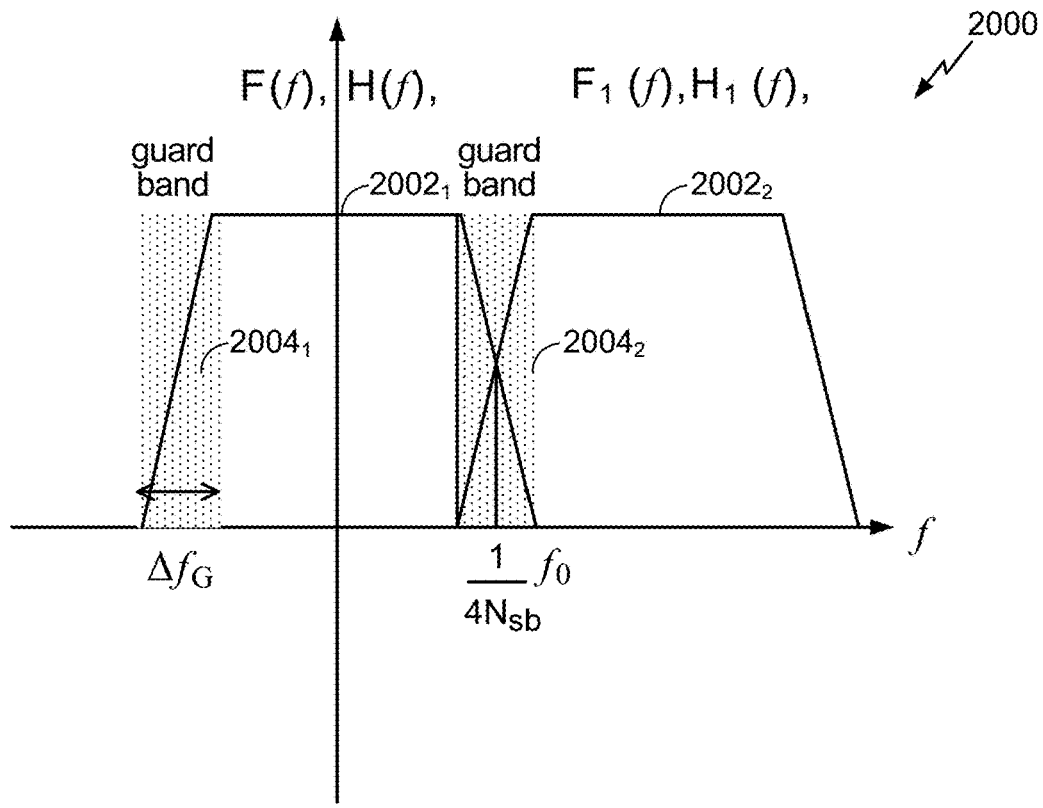
FIG. 20 illustrates example subband separation, in accordance with aspects of the present disclosure.

FIG. 20 illustrates example subband separation 2000, in accordance with aspects of the present disclosure. As noted above, the purpose of subband filters in the subband combiners 1608 and subband segregators 1606 is to avoid or mitigate inter-beam interference (IBI) in the same subband and provide good subband separation. The subband filters $H_k(Z)$ in subband segregator 1606 and $F_k(Z)$ in subband combiner 1608 are generally designed such that all the individual unit subbands 2002 have very good spectral isolation by exploiting the guard bands 2004, as shown in FIG. 20. Filters in the subband segregator 1606 and subband combiner 1608 may have have good out of band attenuation (e.g., of at least 70 dB). The good subband separation avoids the interference of adjacent SB beamformers, reduces IBI and allows the computationally intensive beamforming weighting, $w^H$, in subband combiner 1608 to operate at a lower clock rate (e.g., of 39.6/$N_{sb}$ MHz).

Figure 21:
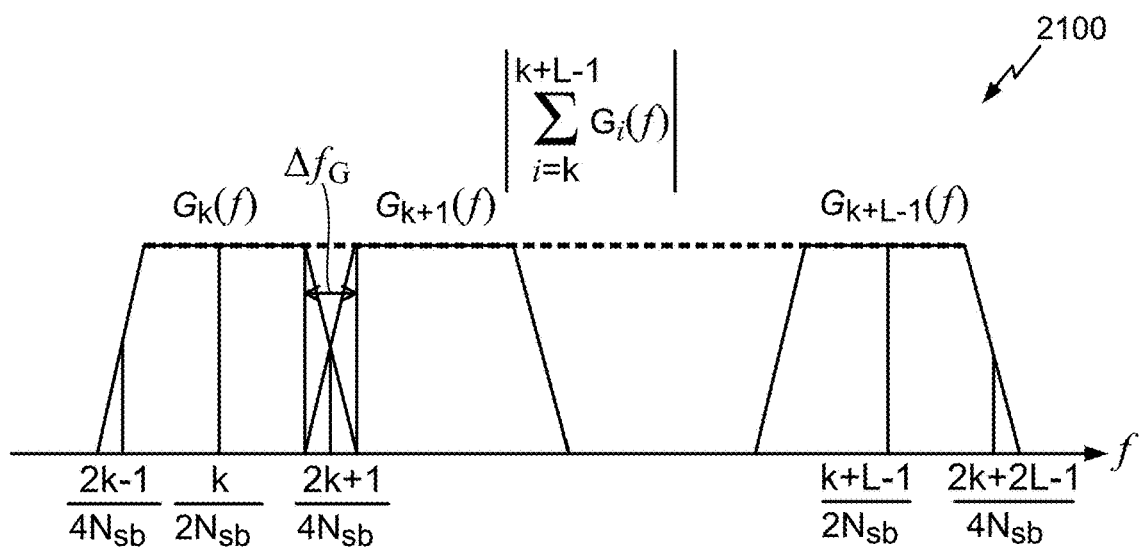
FIG. 21 illustrates example combinable subband units and an example combined subband, in accordance with aspects of the present disclosure.

FIG. 21 illustrates example combinable subband units 2100, in accordance with aspects of the present disclosure. To support dynamically combinable subbands, subband segregator 1606 and subband combiner 1608 are generally designed such that the combined subband frequency response is generally flat for a combination of an arbitrary number L of consecutive subbands. Filters in the subband segregator 1606 and subband combiner 1608 generally have good frequency responses. For a combination of an arbitrary number L of contiguous filters, the frequency response of the combined "fat" subband, including the guard bands between the combined subbands, may be substantially flat, even in the guard band area. The frequency response of the combined "fat" subband may be represented by the equation:

$$\left| \sum_{i=k}^{k+L-1} H_i(f) F_i(f) \right| \approx c \text{ for } \frac{2k-1}{4N_{sb}} + \frac{\Delta f_G}{2} \leq f \leq \frac{2k+2L-1}{4N_{sb}} - \frac{\Delta f_G}{2}$$

The passband ripple of the combined fat subband is less than 0.3 dB such that there is almost no loss of channel capacity. The flat combined frequency response may allow the scheduler 1612 to assign a "fat" subband to a UE (aircraft) with heavy traffic.

Scheduling may be described by considering an example of three UEs, UE0~2, at angle $\theta_{1,0}$, $\theta_{2,0}$ and $\theta_{2,1}$, respectively. The eNodeB scheduler assigns subband 1 (SB1) to UE 0, SB2 to UE 1 and UE 2. By assigning UE1 and UE2 to the same subband, the eNodeB may need to check if UE1 and UE2 are widely separated (e.g., by some threshold value of $\Delta\theta$).

Figure 22:
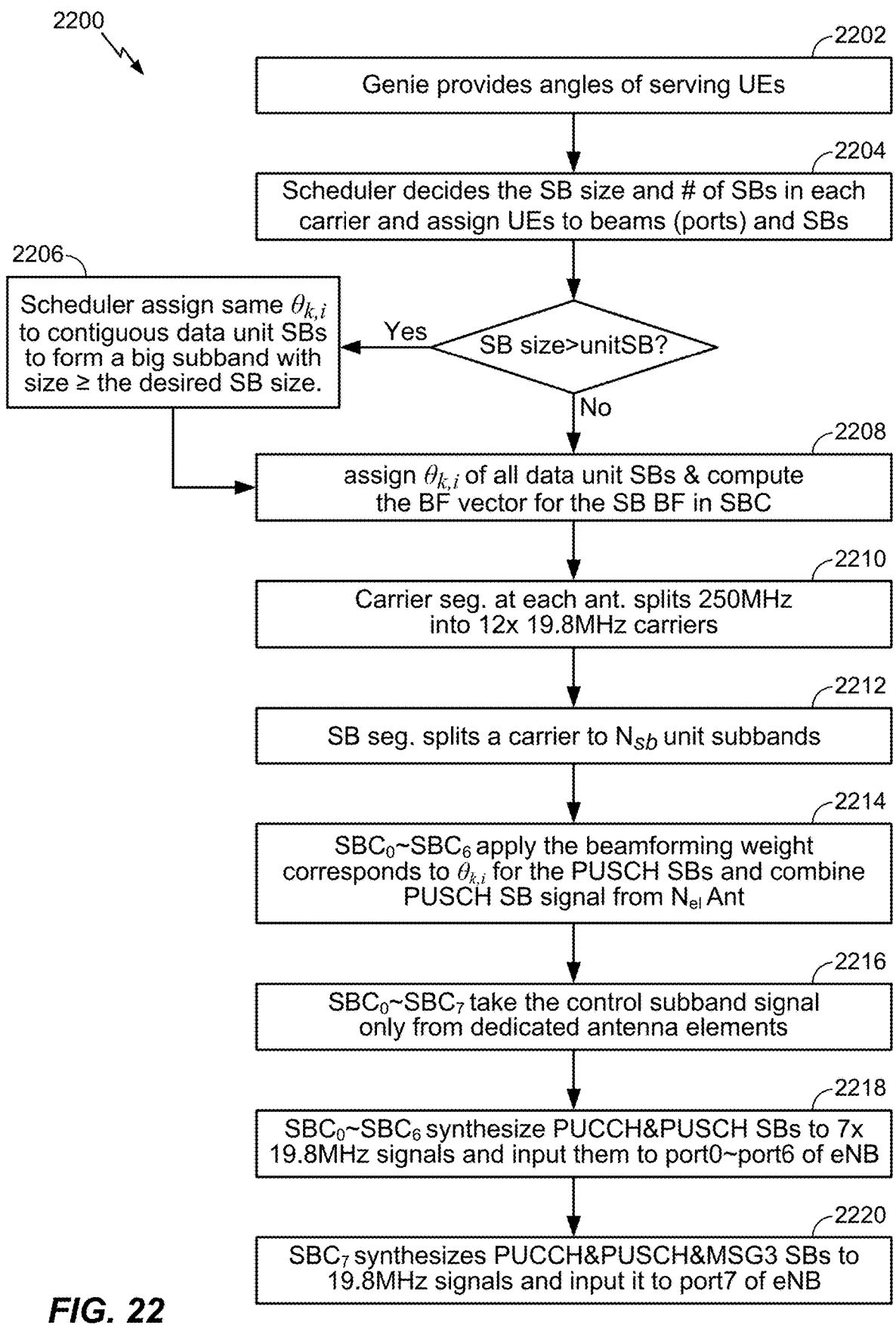
FIG. 22 is a flow diagram of example operations for uplink subband beamforming, in accordance with aspects of the present disclosure.

FIG. 22 is a flow diagram of example operations 2200 for uplink subband beamforming, in accordance with aspects of the present disclosure.

As illustrated, at 2202, a genie tracking system may provide, to a scheduler, the azimuth and elevation angles of the UEs served by a ground base station. For each carrier, at 2204, the scheduler determines the number of contiguous unit subbands for each subband, assigns UEs to beams (ports) and subbands, and provides a beam angle ($\theta_{k,i}$) to each unit data subband. To combine unit subband k to k+L (as a "fat" subband), at 2206 and 2208, the scheduler sets the same angle to the target unit subband (e.g., $\theta_{k,i}=\theta_{k+1,i}= \ldots \theta_{k+L,i}$). At 2210, each carrier segregator 1604 at each antenna may then split the signal into a plurality of carriers (e.g., split a 250 MHz signal into twelve 19.8 MHz carriers). At 2212, the subband segregator 1606 may then split a carrier into $N_{sb}$ unit subbands. At 2214, the subband beamformers in the $i^{th}$ (i=0~6) subband combiner 1608 generally looks up the beamforming weights corresponding to $\theta_{k,i}$ and combines each PUSCH subband signal from $N_{el}$ antenna elements. For the control subbands, at 2216, the subband beamformer may take the subband signal only from dedicated antenna elements. The $0^{th}$ to $6^{th}$ subband combiners 1608 may synthesize PUCCH and PUSCH subbands into a 19.8 MHz signal and input the synthesized PUCCH and PUSCH subbands to ports 0-6, at 2218. At 2220, $SBC_7$ may synthesize control channel signals (e.g., PUCCH/PRACH/MSG3) to a 19.8 MHz signal and inputs the synthesized control channel signals to a dedicated port (e.g., port 7) of the GBS/eNodeB (e.g., for transmission as an omni-directional signal to all connected UEs (aircraft) served by the GBS/eNodeB).

Figure 23:
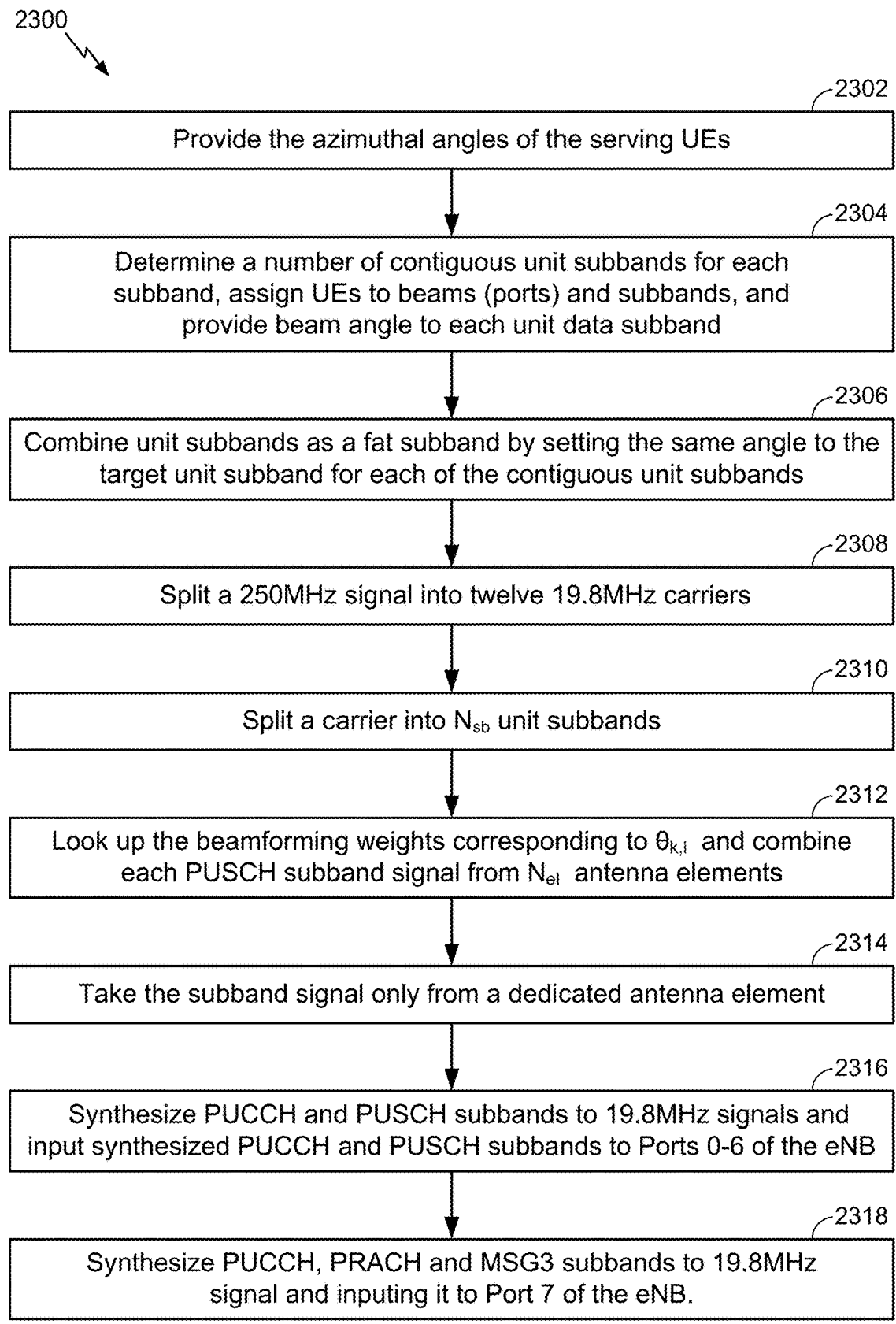
FIG. 23 illustrates example operations for uplink subband beamforming to generate a "fat" uplink subband, in accordance with aspects of the present disclosure.

FIG. 23 is a flow diagram of example operations 2300 for uplink subband beamforming, in accordance with aspects of the present disclosure.

As illustrated, operations 2300 begin at 2302, where a genie tracking system provides, to a scheduler, the azimuth/elevation angles of the UEs served by a ground base station. At 2304, for each carrier, the scheduler determines the number of contiguous unit subbands for each subband, assigns UEs to beams (ports) and subbands, and provides beam angle $\theta_{k,i}$ to each unit data subband. At 2306, to combine unit subband k to k+L as a fat subband, the scheduler sets the same angle to the target unit subbands, $\theta_{k,i}=\theta_{k+1,i}=\ldots=\theta_{k+L,i}$. At 2308, each carrier segregator 1604 at each antenna splits a 250 MHz signal into twelve 19.8 MHz carriers. At 2310, the subband segregator 1606 splits a carrier into $N_{Sb}$ unit subbands. At 2312, the subband beamformers in the $i^{th}$ (i=0~6) subband combiner 1608 looks up the beamforming weights corresponding to $\theta_{k,i}$ and combines the PUSCH subband signals from $N_{el}$ antenna elements. At 2314, for the control subbands, the subband beamformer (e.g., in $SBC_7$) takes the subband signal only from a dedicated antenna element. At 2316, the $0^{th}$ through $6^{th}$ subband combiners 1608 synthesize PUCCH and PUSCH subbands to 19.8 MHz signals and provides the synthesized PUCCH and PUSCH subbands to ports 0 through 6, respectively, of the eNodeB 1610. At 2318, the $7^{th}$ subband combiner 1608 synthesizes PUCCH, PRACH and MSG3 subbands to 19.8 MHz signal and provides the synthesized PUCCH, PRACH, and MSG3 subbands to port 7 of the eNodeB 1610 (e.g., for transmission as an omni-directional signal to the UEs (aircraft) served by the eNodeB).

Aspects of the present disclosure provide an efficient DFT filterbank subband beamformer which can support dynamic subband allocation with multi-user beamforming and subband combining. For a large number of antenna elements, the subband beamformer structure described herein is more efficient than implementing an LTE receiver at each antenna and performing per-tone beamforming. The techniques described herein provide a scalable, low complexity structure for an LTE air-to-ground base station. The ATG base station design described herein may scale with the number of antenna elements and the number of carriers by exploiting the commercial 8-port eNodeB. In one example, the eNodeB may be unaware of the size of the antenna array. The azimuth/elevation angles of the UEs for the beamformer may be provided by a dedicated aircraft tracking system and the scheduler. The techniques described herein generally provide scheduling flexibility, which may, in turn, maximize the network capacity. The techniques described herein support FDMA and SDMA with dynamic subband size. The techniques described herein for multiple subband beamforming with dynamic subband size uses 5% of the complexity and maintains the similar level of flexibility as that found in the prior art.

The uplink subband beamformer design described herein may allow multiple consecutive subbands, including the guard bands between each of the consecutive subbands, to be combined and assigned to a UE (aircraft), which may allow for dynamic allocation of bandwidth to UEs based on bandwidth requirements for each UE. An iterative filter design algorithm for the design may be utilized, in which the combination of consecutive subband filters generally has a flat passband frequency response and in which each subband filter generally has good separation from the other subband filters by exploiting the guardband.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor.

According to certain aspects, such means may be implemented by processing systems configured to perform the corresponding functions by implementing various algorithms (e.g., in hardware or by executing software instructions) described above. For example, an algorithm for receiving, from a BS, configuration information for RAN aggregation for one or more data bearers and offloading rules for WLAN offloading, an algorithm for determining a priority for communicating using RAN aggregation and offloading rules based, at least in part, on the received configuration information, and an algorithm for performing RAN aggregation or WLAN offloading according to the offloading rules based on the determined priority.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
    determining relative angles between a ground station and a plurality of airborne devices;
    performing beamforming processing, based on the relative angles, on uplink signals received from the airborne devices via a number of antenna elements in an antenna array at the ground station to generate combined beamformed signals, each combined beamforming signal comprising beamformed signals for the plurality of airborne devices; and
    feeding the combined beamformed signals to a number of ports of the ground station, wherein the number of ports of the ground station is less than the number of antenna elements in the antenna array at the ground station.

2. The method of claim 1, further comprising feeding at least one non-beamformed subband signal comprising uplink control signaling to a port of the ground station dedicated to non-beamformed subband signals.

3. The method of claim 1, wherein the beamforming processing comprises:
    separating the uplink signals received via the antenna elements of the ground station antenna array on system bandwidth into a plurality of carrier signals for each antenna element in the antenna array at the ground station;
    partitioning each of the carrier signals from each antenna element into a plurality of unit subband signals for each antenna element;
    performing beamforming on the unit subband signals from the antenna elements occupying a same subband frequency within a carrier by combining those unit subband signals across the antenna elements using antenna weights selected based on the relative angles; and
    combining the beamformed unit subband signals for a carrier to generate the combined beamformed signal for the carrier.

4. The method of claim 3, wherein the separating the uplink signals received via the antenna elements on system bandwidth into a plurality of carrier signals for each antenna element comprises splitting a carrier aggregated signal into a plurality of carrier signals for each antenna element;
    wherein performing beamforming of the unit subband signals from the antenna elements using antenna weights selected based on the relative angles comprises partitioning at least one of said carrier signals into unit subband signals;
    wherein combining the beamformed unit subband signals for a carrier to generate the combined beamformed signals for the carrier comprises combining said beamformed unit subband signals for the carrier to produce at least one subband combiner (SBC) output signal for the carrier, the beamformed unit subband signals being obtained from at least one of said antenna elements and corresponding to different subband frequencies within the carrier, to produce at least one subband combiner (SBC) output signal for the carrier; and
    wherein feeding the combined beamformed signals to a number of ports of the ground station comprises transmitting at least one of said SBC output signals to at least one port of the number of ports of the ground station.

5. The method according to claim 4, wherein said at least one subband combiner (SBC) output signal comprises a plurality of contiguous unit subbands; and wherein the method further comprises assigning at least one airborne device to said at least one unit subband, and providing an angle to said at least one unit subband.

6. The method according to claim 5, further comprising:
    assigning the angle to said contiguous data unit subband signals if a subband size is greater than the unit subband, wherein the angle is a function of azimuth and elevation angle of the airborne device with respect to the antenna array at the ground station.

7. The method of claim 6, wherein said azimuth and elevation angles are provided by an airplane tracking genie system.

8. The method according to claim 3, further comprising assigning at least one middle unit subband of the unit subbands as a data subband.

9. The method according to claim 1, wherein guard bands are located between data unit subbands allocated to different airborne devices.

10. The method according to claim 4, further comprising independently demodulating at least one of said subband combiner (SBC) output signals using an $N_p \times 2048$-point FFT at the ground station, where $N_p$ represents the number of ports of the ground station.

11. The method of claim 3, wherein the plurality of unit subband signals partitioned from at least one of the carrier signals comprises one or more unit subband signals for non-beamformed subband signals comprising uplink control signaling.

12. The method of claim 11, wherein the non-beamformed subband signals are taken from dedicated antenna elements.

13. The method of claim 3, further comprising:
    allocating beams and unit subbands to the plurality of airborne devices.

14. The method of claim 13, wherein the allocating comprises at least one of:
    allocating same frequency resources to different airborne devices; or
    allocating different resource blocks to different airborne devices.

15. The method of claim 13, wherein the allocating comprises dynamically allocating beams and unit subbands to each of the plurality of airborne devices based on relative uplink traffic load of the plurality of airborne devices.

16. The method of claim 15, wherein the dynamically allocating comprises selecting at least one or any number of contiguous unit subbands.

17. The method of claim 15, wherein the allocating comprises assigning a bandwidth larger than a single unit subband to an airborne device.

18. The method of claim 17, wherein the assigning comprises assigning same angles to all selected contiguous unit subbands that span the assigned bandwidth.

19. The method of claim 17, wherein the assigning comprises utilizing one or more filters such that, when frequency responses of unit subband filters for those said unit subbands are combined, a passband ripple of the combined frequency response is negligible.

20. The method of claim 1, further comprising combining signals from dedicated antenna elements to synthesize a control subband combiner output signal.

21. The method of claim 1, further comprising combining unit data subband signals to synthesize a data subband combiner output signal.

22. A beamforming apparatus, comprising:
at least one carrier segregator operably connected to at least one antenna element, wherein said carrier segregator is configured to split a carrier aggregated signal into a plurality of carrier signals;
at least one subband segregator configured to partition at least one of said carrier signals into unit subband signals for a plurality of user equipments (UEs); and
a subband combiner operably connected to the at least one subband segregator configured to combine said unit subband signals from the at least one antenna element to produce at least one subband combiner (SBC) output signal including beamformed unit subband signals for the plurality of UEs, with each subband having a 10 $\log_{10} N_{el}$ beamforming gain, where $N_{el}$ represents the number of the at least one antenna element.

23. The beamforming apparatus of claim 22, wherein the unit subband signals are coherently combined.

24. The beamforming apparatus of claim 22, wherein the at least one subband segregator comprises at least one subband filter $H_k(z)$, wherein the at least one frequency subband filter $H_k(z)$ comprises a frequency translated version of a prototype filter $H(z)$ having a frequency response $$H_k(z) = H(zW_{2N_{sb}}^k), \quad W_{2N_{sb}} = e^{\frac{-j\pi}{N_{sb}}}.$$

25. The beamforming apparatus of claim 22, wherein the at least one subband combiner comprises at least one subband filter $F_k(z)$, wherein the at least one subband filter $F_k(z)$ comprises a frequency translated version of a prototype filter $F(z)$ having a frequency response $$F_k(z) = F(zW_{2N_{sb}}^k), \quad W_{2N_{sb}} = e^{\frac{-j\pi}{N_{sb}}}.$$

26. The beamforming apparatus of claim 22, further comprising:
a tracking system operably connected to said subband combiner configured to provide azimuth and elevation angles of serving airborne devices, wherein a same angle is provided to said contiguous data subband unit signals if a subband size is greater than a unit subband, wherein the angle is a function of the azimuth and elevation angle.

27. The beamforming apparatus of claim 22, wherein the at least one subband combiner combines signals from dedicated antenna elements to synthesize a control subband combiner output signal.

28. The beamforming apparatus of claim 22, wherein the at least one subband combiner combines unit data subband signals to synthesize a data subband combiner output signal.

29. An apparatus for wireless communications, comprising:
means for determining relative angles between a ground station and a plurality of airborne devices;
means for performing beamforming processing, based on the relative angles, on uplink signals received from the airborne devices via a number of antenna elements of the ground station antenna array to generate combined beamformed signals, each combined beamforming signal comprising beamformed signals for the plurality of airborne devices; and
means for feeding the combined beamformed signals to a number of ports of the ground station, wherein the number of ports of the ground station is less than the number of antenna elements.

30. A non-transitory computer-readable medium comprising instructions which, when executed by one or more processors, performs an operation comprising:
determining relative angles between a ground station and a plurality of airborne devices;
performing beamforming processing, based on the relative angles, on uplink signals received from the airborne devices via a number of antenna elements of the ground station antenna array to generate combined beamformed signals, each combined beamforming signal comprising beamformed signals for the plurality of airborne devices; and
feeding the combined beamformed signals to a number of ports of the ground station, wherein the number of ports of the ground station is less than the number of antenna elements.

* * * * *